(12) United States Patent
Williams et al.

(10) Patent No.: US 7,194,817 B2
(45) Date of Patent: *Mar. 27, 2007

(54) INTRINSIC GAUGING FOR TUBE FITTINGS

(75) Inventors: Peter C. Williams, Cleveland Heights, OH (US); Lonnie E. Johnston, Aurora, OH (US); John D. Karkosiak, Broadview Heights, OH (US); Gerald A. Babuder, Mentor, OH (US); Sanjeev S. Moghe, Northfield Center, OH (US)

(73) Assignee: Swagelok Company, Solon, OH (US)

( * ) Notice: Subject to any disclaimer, the term of this patent is extended or adjusted under 35 U.S.C. 154(b) by 3 days.

This patent is subject to a terminal disclaimer.

(21) Appl. No.: 10/711,353

(22) Filed: Sep. 13, 2004

(65) Prior Publication Data

US 2005/0097763 A1 May 12, 2005

Related U.S. Application Data

(63) Continuation-in-part of application No. PCT/US03/07739, filed on Mar. 12, 2003.

(51) Int. Cl.
*F16L 35/00* (2006.01)
*B23Q 17/00* (2006.01)
*G01B 3/00* (2006.01)

(52) U.S. Cl. ............... 33/501.45; 33/645; 285/93; 411/14

(58) Field of Classification Search ............ 33/501.45, 33/613, 645, 533; 285/93; 411/14, 11, 10
See application file for complete search history.

(56) References Cited

U.S. PATENT DOCUMENTS

| 2,029,798 A | 2/1936 | Schellin |
| 2,322,587 A | 6/1943 | Payne |
| 2,499,024 A | 2/1950 | Hollyday, Jr. |
| 3,025,084 A | 3/1962 | Franck |
| 3,103,373 A | 9/1963 | Lennon et al. |
| 3,139,293 A | 6/1964 | Franck |
| 3,153,974 A | 10/1964 | Canning |
| 3,287,813 A | 11/1966 | Lennon et al. |
| 3,321,947 A | 5/1967 | Teeters |
| 4,127,927 A | 12/1978 | Hauk et al. |

(Continued)

FOREIGN PATENT DOCUMENTS

| DE | 2421470 | 11/1975 |
| DE | 4413595 | 10/1995 |
| EP | 863 354 | 9/1998 |
| EP | 903529 | 3/1999 |
| FR | 1321483 | 2/1962 |
| FR | 1393452 | 2/1964 |
| GB | 736814 | 9/1955 |
| GB | 1361372 | 7/1974 |
| GB | 2049853 | 12/1980 |
| GB | 2115940 | 9/1983 |

(Continued)

OTHER PUBLICATIONS

Copy of Examination Report issued Aug. 31, 2005 from corresponding European Patent Application Serial No. 05004914.7-2424, 4 pgs.
Copy of International Search Report from PCT/US2005/031918.
Swagelok Tube Fitting Instructions for 1 in. (25 mm) and smaller fittings instructions, one page, Feb. 2002 from www.Swagelok.com.

*Primary Examiner*—Christopher W. Fulton
(74) *Attorney, Agent, or Firm*—Calfee, Halter & Griswold LLP

(57) ABSTRACT

An intrinsic gauging device for a ferrule type tube fitting of the type having a coupling nut, a coupling body and at least one ferrule, includes a precisely formed marking on the coupling nut that is visually perceptible that indicates the pull-up position of the tube fitting assembly.

37 Claims, 20 Drawing Sheets

U.S. PATENT DOCUMENTS

| | | |
|---|---|---|
| 4,162,802 A | 7/1979 | Cox |
| 4,919,455 A | 4/1990 | Yoshiro |
| 4,925,217 A | 5/1990 | Ketcham |
| 5,074,599 A | 12/1991 | Wirbel et al. |
| 5,134,783 A | 8/1992 | Perry |
| 5,226,679 A | 7/1993 | Klinger |
| 5,280,967 A | 1/1994 | Varrin, Jr. |
| 5,388,866 A | 2/1995 | Schlosser |
| 5,441,312 A | 8/1995 | Fujiyoshi et al. |
| 5,472,242 A | 12/1995 | Petersen |
| 6,073,976 A | 6/2000 | Schmidt et al. |
| 6,279,242 B1 | 8/2001 | Williams et al. |
| 6,502,323 B2 | 1/2003 | Williams et al. |
| 6,640,457 B2 | 11/2003 | Williams et al. |
| 6,766,582 B2 | 7/2004 | Williams et al. |
| 2001/0047593 A1 | 12/2001 | Williams et al. |

FOREIGN PATENT DOCUMENTS

| | | |
|---|---|---|
| GB | 2120795 | 12/1983 |
| GB | 2225073 | 5/1990 |
| JP | 1295015 | 11/1989 |
| JP | 5280520 | 10/1993 |
| JP | 7243564 | 9/1995 |
| WO | WO 01/20214 | 3/2001 |

FINGER TIGHT POSITION AT START

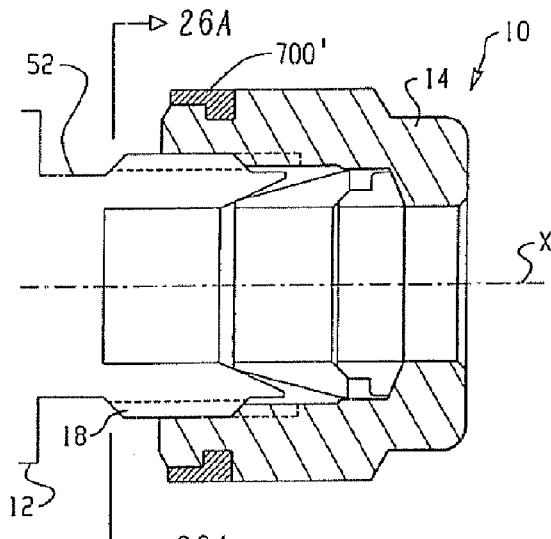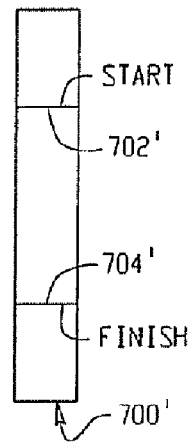
Fig. 26  Fig. 26A
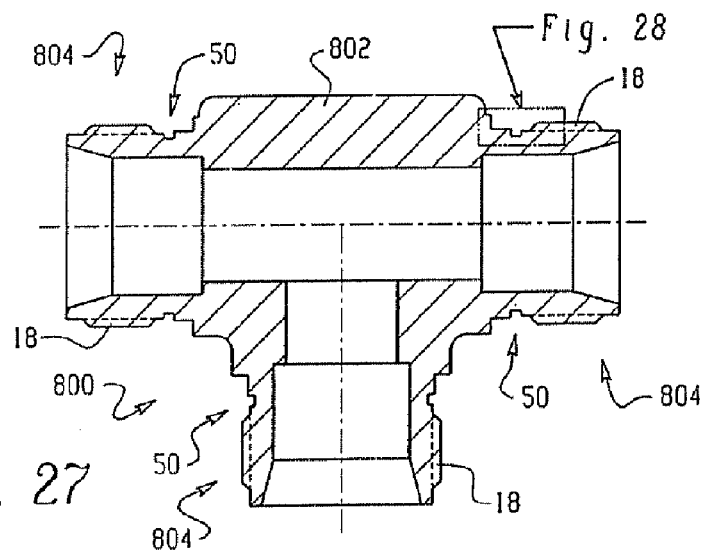
Fig. 27
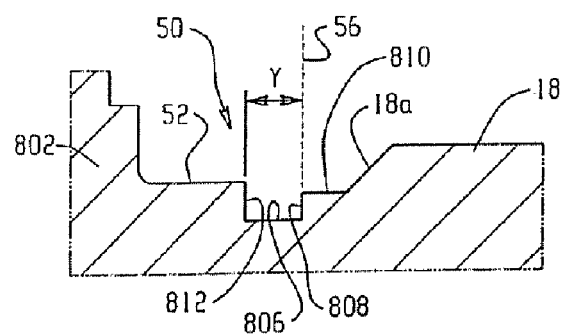
Fig. 28

INTRINSIC GAUGING FOR TUBE FITTINGS

RELATED APPLICATIONS

This application is a continuation in part of International Application No. PCT/US03/07739 filed Mar. 12, 2003, which claims priority to U.S. patent application Ser. No. 10/095,841 filed Mar. 12, 2002, now U.S. Pat. No. 6,640,457, which claims the benefit of U.S. patent applications Ser. No. 09/924,030 filed Aug. 7, 2001 for INTRINSIC GAUGING FOR TUBE FITTINGS, now U.S. Pat. No. 6,502,323, and is a continuation in part of International Application No. PCT/US00/24900 filed Sep. 12, 2000, which is a continuation of Ser. No. 09/395,386 filed Sep. 13, 1999 for INTRINSIC GAUGING FOR TUBE FITTINGS, now U.S. Pat. No. 6,279,242 and which also claims the benefit of U.S. Provisional Patent Application Ser. No. 60/159,965 filed Oct. 18, 1999 for INTRINSIC GAUGING FOR TUBE FITTINGS, the entire disclosures of the aforementioned patent applications all of which are fully incorporated herein by reference.

TECHNICAL FIELD OF THE INVENTION

The present invention relates to tube fittings of the type that use one or more ferrules for gripping a tube end. More particularly, the invention relates to apparatus and methods for visual verification that the fitting has been properly pulled up.

BACKGROUND OF THE INVENTION

Ferrule-type tube fittings are well known in the art. A two ferrule fitting that has been highly successful for over 30 years is a sequential gripping arrangement invented by Lennon, et al., U.S. Pat. No. 3,103,373, the entire disclosure of which is fully incorporated herein by reference.

In a typical ferrule-type tube fitting assembly there is a coupling arrangement that includes a coupling body and a coupling nut that is threadably engaged with threads on one end of the coupling body. The coupling body includes a torquing flange, typically in the form of a hex shaped flange. The coupling body at the other end may be joined to or integral with another body, flow control device and so on. The coupling body includes an axially tapered opening or camming mouth and a shoulder or stop axially spaced from the tapered opening. Two gripping components or ferrules, including a rear ferrule and a front ferrule, are positioned within the coupling nut and are interposed between the coupling body and the coupling nut. The tapered front end of the front ferrule initially engages the camming mouth of the coupling body and a tapered front end of the rear ferrule initially engages a camming surface at the back end of the front ferrule. The coupling nut has a shoulder that drivingly engages a back wall of the rear ferrule. A tube end is axially inserted into the fitting until the tube end abuts the inner shoulder stop of the coupling body. Upon relative rotation of the coupling body and nut which drives the coupling components axially towards each other, the tapered ferrules are axially pulled together, commonly referred to in the art as being "pulled-up", and radially displaced inwardly to cause a sequential inward gripping of the tube. The ferrules tightly grip the tube wall due to the swaging action.

Typically, a tube fitting assembly such as described above, is shipped to a customer in an assembled condition with the ferrules installed in the coupling nut and the coupling nut threaded onto the coupling body to a finger tight condition. The assembler then slips a tube end axially into the fitting until it bottoms or abuts the inner stop shoulder on the coupling body. With the fitting in an initial finger tight condition, the assembler, using a wrench or spanner or the like for example, then imparts a relative rotation between the coupling body and the coupling nut for a predetermined rotation to complete the installation. For smaller tube fittings, for example tube fittings used on one-quarter (¼) to one (1) inch tubing, there is typically a relative rotation of one and a quarter "turns past finger tight" ("TPFT") position to achieve proper initial pull-up.

The number of turns to properly pull-up a fitting assembly is determined by a number of factors including the thread pitch and the proper axial displacement of the coupling nut relative to the coupling body to insure that the ferrules are properly swaged onto the tube wall. Although the various parts of the fitting are machined with high precision and assembled to a finger tight position, it still can be difficult to keep track of the number of rotations and fractions thereof to pull-up the fitting. Many times the fitting is being installed in an area with limited clearance for the wrench, thus necessitating a number of separate wrenching operations for one complete rotation.

A successful and commonly used solution to verifying proper pull-up is a NO-GO gauge as described in U.S. Pat. No. 3,287,813 to Lennon et al., the entire disclosure of which is fully incorporated herein by reference. This gauge effectively verifies that the gap or relative spacing between the coupling body flange and the forward end of the coupling nut is of the correct dimension. The assembler first imparts the required relative rotation between the coupling nut and body. If the gauge cannot fit between the body and the coupling nut, the assembler knows that the nut has at least been properly pulled-up.

Although the gauging tool described above continues to enjoy excellent commercial success and use, there are applications where the use of the gauge may be an inconvenience. Of particular interest is the need for a gauge that does not necessarily require a separate gauge tool, but rather could be intrinsically part of the fitting.

Additionally, the NO-GO gauge is used principally for initial pull-up of the fitting assembly. In some cases, a coupling may be disassembled by unthreading the coupling nut from the body for repair or replacement of the device joined to the tube end. During remake of the fitting, typically the relative rotation between the coupling nut and body requires fractionally more turns than is required for initial pull-up, or in other words the axial displacement of the coupling nut towards the coupling body is slightly greater each pull-up compared to the previous pull-up operation. A manufacturer may determine a recommended number of remakes or axial displacement of the coupling nut with respect to the coupling body based on a predetermined amount or axial displacement beyond the initial pull-up position. The design factors taken into consideration may include the pressure and temperature ratings for the fitting, the materials used in the tubing and the fitting components and so on.

The actual number of remakes a given fitting assembly can undergo and still exhibit acceptable performance characteristics may be significantly higher than a recommended distance of additional axial displacement past the initial pull-up position, but it may still be desirable in some cases to be able to provide an indication to the assembler that the fitting assembly has been remade a number of times so as to have advanced the coupling nut and body together a predetermined axial displacement beyond initial pull-up. Since the hand gauge discussed above necessarily has a fixed axial dimension, it is not useful for verifying additional axial displacement for remade fittings.

It is therefore an objective of the present invention to provide apparatus and method for verifying proper pull-up of a ferrule-type tube fitting for initial pull-up. It is another objective to provide apparatus and method that verifies proper initial pull-up and also can be used to provide an indication that the fitting has been remade a number of times so as to indicate a predetermined axial displacement of the coupling nut relative to the coupling body.

SUMMARY OF THE INVENTION

To the accomplishment of the aforementioned and other objectives, and in accordance with one embodiment of the invention, an intrinsic gauging device includes a precisely formed and positioned marking on the coupling body that is visually perceptible when the coupling is in a finger tight position, and that is covered or visually imperceptible when the fitting has been properly pulled-up. In a preferred form, the marking is realized as a precision groove or recess machined into a surface of the coupling body. The groove can be made more visually perceptible such as by roughening or knurling the surface, or coloring the surface, for example. Use of the intrinsic gauge thus avoids the need to count or remember the number of relative rotations and fractional rotations imparted to the coupling nut and body. The position of the marking corresponds to a predetermined axial displacement of the coupling nut relative to the coupling body for initial pull-up.

The invention further contemplates the methods embodied in the use of such an intrinsic gauging device, as well as in another embodiment, a method for gauging proper pull-up of a coupling nut on a coupling body in a ferrule type fitting, the method including the steps of positioning a visually perceptible marking on the coupling body; forming the marking with an axial length that corresponds to a predetermined axial displacement of the coupling nut relative to the coupling body; assembling the fitting to a finger tight condition; and tightening the coupling nut onto the coupling body until the marking is just hidden from view by the nut.

In accordance with another aspect of the invention, the marking may be formed with a predetermined axial dimension and precisely located on the coupling body so that upon proper initial pull-up the coupling nut aligns with a leading edge of the marking; and upon a predetermined additional axial displacement of the coupling nut relative to the coupling body during subsequent remakes, the nut covers the marking or aligns with a trailing edge of the marking.

The present invention also contemplates apparatus and methods for verifying initial pull-up and remake positions by providing a device installed on the fitting or formed integral therewith that changes shape or is altered in a visually perceptible way when a fitting has been initially pulled-up. In another aspect of the invention, a device is provided that provides visual indication of the initial pull-up position and additional axial displacement of the nut upon remakes of the fitting wherein the device is installed on the fitting or formed integral therewith and changes shape or is altered in a visually perceptible way when a fitting has been initially pulled-up and remade so as to cause additional axial displacement of the nut onto the body. In a further aspect of the invention, a visually perceptible marking is applied to the tubing to provide a visual indication that the nut has been installed to the initial pull-up position and to a position that is axially advanced a predetermined axial displacement beyond the initial pull-up position.

These and other aspects and advantages of the present invention will be apparent to anyone skilled in the art from the following description of the preferred embodiments in view of the accompanying drawings.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein:

FIGS. 25 and 26 illustrate embodiments that use rotational position indicators;

FIGS. 27 and 28 illustrate use of the invention with a traditional T style fitting body;

DETAILED DESCRIPTION

Figure 1:
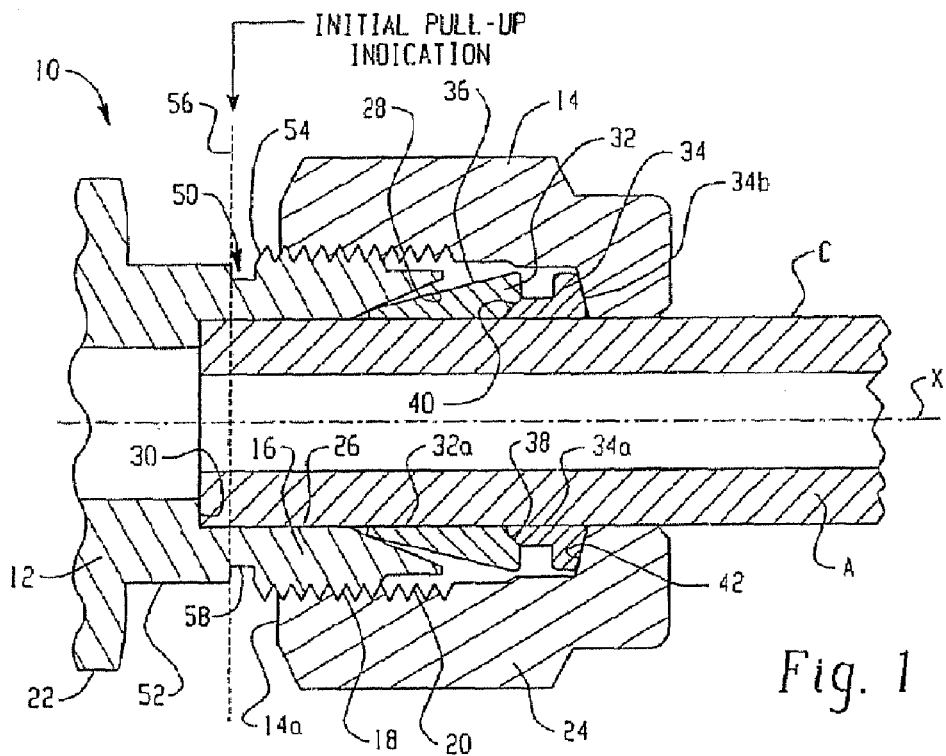
FIG. 1 is a ferrule-type fitting that incorporates an intrinsic gauge feature in accordance with the invention, the fitting being shown in longitudinal cross-section in a finger tight position.

With reference to FIG. 1, the invention will be described herein in an exemplary manner as being incorporated into a standard two ferrule style tube fitting assembly. However, this description is intended to be exemplary in nature to explain and illustrate the concepts and advantages of the present invention, and therefore should not be construed in a limiting sense. Persons of mere ordinary skill in the art will readily understand and appreciate that the invention can be put to practice in a wide variety of tube fittings and couplings that are relatively rotated to make up the assembly. For example, and not for purposes of limitation, the present invention can conveniently be used in a single ferrule tube fitting or with any two part coupling in which proper assembly is determined in part by relative rotation between two threaded parts.

The standard fitting assembly 10 includes a coupling body 12 and a coupling nut 14. The coupling body 12 includes a first end 16 that is externally threaded as at 18. The coupling nut is internally threaded as at 20 and the nut 14 can be easily installed on the coupling body 12 by relative rotation between the body 12 and the nut 14. The term "relative" rotation is used herein because although a typical assembly procedure for the fitting 10 involves restraining the body 12 against rotation and turning the nut 14 with a wrench, such a procedure is not required to practice the present invention. It is contemplated that the body 12 could be rotated while holding the nut 14 stationary, or alternatively, rotational movement could be applied to both the nut and body to rotate them in opposite directions at the same time to make up the fitting 10. The body and nut are typically provided with hex shaped portions 22, 24 respectively to assist in the use of a wrench or other tool to impart the relative rotation.

The threaded end 16 of the body 12 has a central bore or passageway 26 that extends longitudinally all the way through the coupling body 12. This bore 26 is formed with a tapered camming mouth 28 at the forward end of the coupling body 12. The coupling body 12 includes an inner shoulder 30 such as a counterbore that is axially spaced from the camming mouth 28.

The fitting assembly 10 further includes a front ferrule 32 and a rear ferrule 34. The front ferrule 32 has a tapered nose portion 36 that engages the tapered camming mouth 28 of the coupling body 12. The front ferrule 32 also is formed with a tapered camming mouth 38 at the back end thereof. The rear ferrule 34 includes a tapered nose portion 40 that engages the tapered camming mouth 38 of the front ferrule 32. All of the fitting 10 components are commercially available from Swagelok Company, Solon, Ohio.

The fitting assembly 10 is illustrated in FIG. 1 in the "finger tight position" or FTP as the fitting would typically be received from the manufacturer. The drawing also illustrates the fitting 10 after a tube end A has been inserted into the fitting 10. Since the coupling components 12, 14 are only finger tight, the tube end A easily slides into the fitting assembly 10 until the tube end wall B abuts the inner shoulder 30 of the coupling body 12. The front and rear ferrules 32, 34 both have generally cylindrical bores 32a and 34a respectively that are closely received about the tubing outer wall C.

It is important to note that the present invention is not limited to the ferrule geometry illustrated in the drawings. Many different ferrule configurations can be used with the present invention.

The coupling nut 14 includes an inwardly extending shoulder 42 that serves as a driving surface that engages the back wall 34b of the rear ferrule 34. As the coupling nut 14 is tightened down onto the coupling body 12, the rear ferrule 34 is driven forward into the camming mouth at the back end of the front ferrule 32 and a sequential gripping operation takes place as described in the above referenced patents to cause inward radial displacement of the ferrules 32, 34 to swage them into a strong and fluid tight grip on the tube wall C (see FIG. 2).

The relative axial displacement of the coupling nut 14 onto the coupling body 12 is related to the number of complete and fractional relative rotations between the body 12 and the nut 14. The nut 14 is advanced far enough relative to the body 12 to impart a strong gripping action by the ferrules 32, 34 on the tube wall C. Accordingly, a typical assembly instruction would indicate the number of full and fractional turns to impart, for example, to the coupling nut 14 while holding the coupling body 12 stationary.

As technology advances in the materials and design of the fitting 10 components, the torque needed to make up the fitting 10 tends to decrease. For example, this decrease in make-up torque can result from improvements that reduce galling between the nut 14 and the rear ferrule 34. Whatever the reason may be, reduced torque makes it easier for an assembler to inadvertently advance the nut 14 axially beyond the point sufficient for initial pull-up of the fitting 10. Over advancing the nut 14 relative to the body 12 beyond this point is typically accommodated by the fitting design due to the desirability in some applications to permit remakes. However, such over advancing of the nut 14 onto the body 12 during initial pull-up reduces the additional relative axial displacement available for subsequent remakes, which thus in turn reduces the available number of remakes.

In accordance with a feature of the invention, an intrinsic gauging device is provided on the coupling body 12. By "intrinsic gauging" is simply meant that the gauge device and/or function or methodology is inherently embodied in or assembled to or installed on one or more of the fitting components and therefore can be used without any external or separate gauging tool. In the preferred but not required form, the intrinsic gauge is realized as a precisely positioned visually perceptible marking on the coupling body 12. In this exemplary embodiment, the marking is a precision machined groove or recess 50 formed in the coupling body neck 52. More preferably, the groove 50 is positioned adjacent to or near the end thread 54 of the threaded body 12. The groove 50 has a leading edge 50a and a trailing edge 50b. The groove 50 is visually perceptible to an assembler when the fitting is in the FTP as illustrated in FIG. 1. The groove 50 is preferably but again not necessarily circumferential. Alternatively, for example, the groove 50 could be formed in arcuate sections about the body neck 52. Virtually any geometric shape could be machined into the body 12 to form the marking 50 so long as it has a well defined and visually perceptible edge or edges or other suitable demarcation, as will be apparent from the following discussion.

Figure 2:
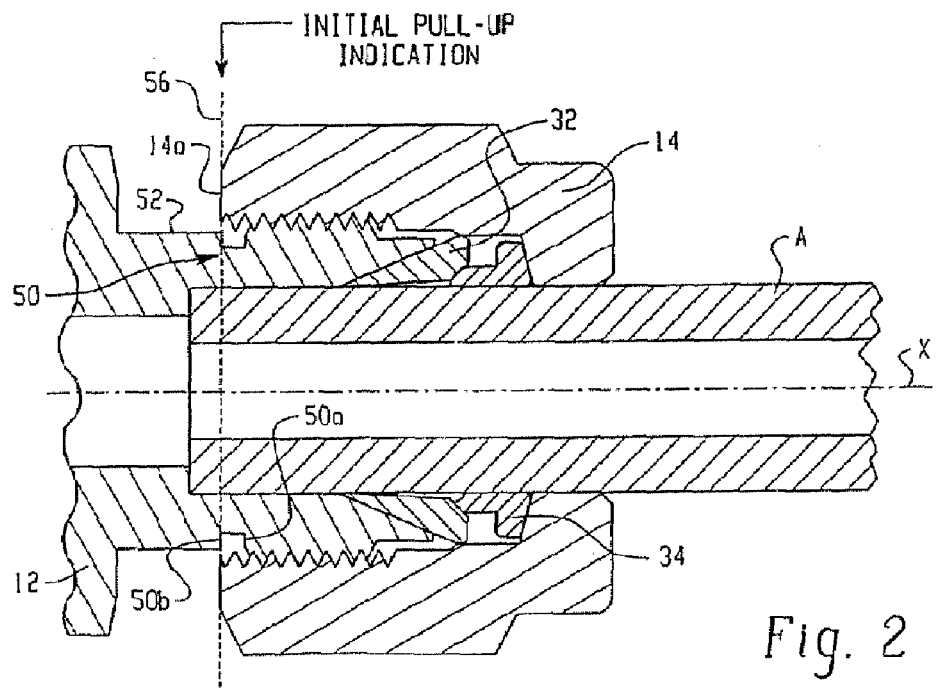
FIG. 2 is the fitting of FIG. 1 shown in a proper pulled-up condition.

The axial position 56 of the trailing edge 50b of the groove 50 is precisely machined so that when the fitting 10 has been properly and initially pulled-up, as illustrated in FIG. 2, the coupling nut forward end 14a substantially aligns with the edge 50b and the nut 14 substantially obstructs visual perception of the groove 50, particularly from a lateral viewing angle relative to the longitudinal axis X of the fitting 10. The precise location and positioning of the trailing edge 50b is used as a marker so that the assembler can pull-up the fitting 10 by advancing the coupling nut 14 relative to the coupling body 12 to the proper initial position, referred to herein as the "predetermined initial pull-up". This predetermined initial pull-up condition corresponds to a predetermined initial axial position of the nut 14 relative to the body 12 for initial pull-up to swage the ferrules 32, 34 onto the tube wall C. To aid in the visual perception of the groove 50 before the assembly is in the pulled-up condition, the groove 50 can be colored as by applying a paint or other coloring material to the visually perceptible surface, such as the bottom groove surface 58. For example, an adhesive strip with a suitable color can be placed in the groove 50. Still further, the groove surface 58 could be knurled or otherwise changed in texture or appearance to be easily seen to the human eye. Further still, a snap ring may be installed into the groove 50.

Still as another alternative to forming a groove 50, a machined band could be formed in or on the neck 52, such as again by knurling, stippling, roughening and so forth.

For the initial pull-up gauging aspect of the invention, the use of a groove improves visual perception of the edge 50b. Those skilled in the art will readily appreciate that the marking 50 may be realized in the form of any suitable edge, line or other demarcation either raised or recessed in the coupling body 12 or applied to the coupling body 12 and that is visually perceptible during pull-up to indicate to the assembler that the predetermined initial pull-up position has been reached and therefore further advancing of the nut 14 is no longer required. Of course, the assembler can still rotate the nut 14 past this position, but in any case the intrinsic gauge has provided the indication that the nut 14 has been pulled up to at least the initial pull-up position.

As an exemplary assembly procedure and method for intrinsic gauging, the assembler installs the tube end A into the fitting. Using a wrench or other suitable tool the coupling body 12 is held stationary and the coupling nut 14 rotated until the marking 50 is just obstructed from view. For embodiments that use a simpler demarcation for the marking 50, the nut 14 is rotated until the edge 14a of the nut substantially aligns with the marking 50. Therefore, with the present invention there is no need to count or keep track of the number of complete and fractional relative rotations between the body 12 and the nut 14.

For fittings 10 that will be made and remade, the leading edge 50a can also be precisely axially positioned so that in the FTP the leading edge 50a will be axially spaced from the forward end 14a of the nut 14. The leading edge 50a is positioned such that when the proper pull-up has been effected, the forward end 14a of the nut 14 aligns with the leading edge 50a. During subsequent remakes, the nut 14 axially advances a little further each time to achieve proper pull up. After a predetermined number of remakes the forward end 14a of the nut 14 aligns with the trailing edge 50b of the marking 50, thereby substantially covering the marking 50, and the assembler knows that the fitting 10 has been remade to the point where the coupling nut 14 has been axially advanced a predetermined amount relative to the coupling body 12 past the initial pull-up condition. The axial length between the leading and trailing edges 50a, 50b of the marking 50 can be determined from design analysis and empirical data so that the marking 50 becomes covered by the nut 14 after a number of remakes that corresponds to a predetermined advance of the coupling nut 14 relative to the coupling body 12 beyond the predetermined initial pull-up position. Although the precise distance Y can be determined and machined into the body 12 if required, precise location of the trailing edge is not necessarily required to practice the present invention. This is because in some applications it may only be required to give a close approximation of the desired additional axial displacement beyond the initial pull-up position.

Regardless of its form, the marking 50 can be precisely machined based on the machining profile of the body 12 so that the marking provides an accurate and permanent visually perceptible indicia for determining proper pull-up of the fitting 10.

With reference to the remaining figures, we illustrate a variety of different embodiments of the invention. These variations are intended to be exemplary in nature and should not be construed in a limiting sense as to the scope of the invention. Where like parts are used for the fitting 10, such as the body, nut and ferrules, like reference numerals are used for the corresponding parts described hereinabove with respect to the embodiment of FIGS. 1 and 2.

Figure 3:
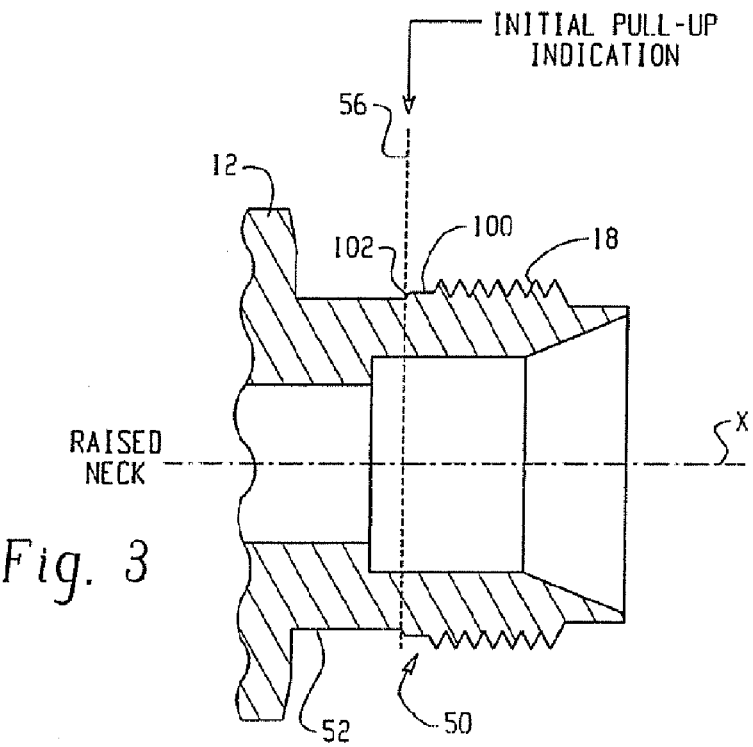
FIG. 3 illustrates an alternative embodiment in which a marking is in the form of a raised portion.

In FIG. 3 then, the marking 50 is realized in the form of a raised portion 100 of the neck 52 on the body 12. The raised portion 100 may be colored or otherwise treated to be visually perceptible to the fitting assembler. The raised portion 100 defines an edge 102. The nut 14 (omitted in FIG. 3) is installed onto the body 112 until the nut back end 14a covers the raised portion 100. In this condition the nut 14 will at least be aligned with or cover the edge 102. This edge 102 then corresponds to the desired initial pull-up position of the nut, in a manner similar to the trailing edge 56 in FIG. 1. In FIG. 3, the raised portion 100 is formed adjacent the back end of the body threads 18; however, the precise position of the marking 50 will be determined for each size fitting as previously described hereinabove.

Figure 4:
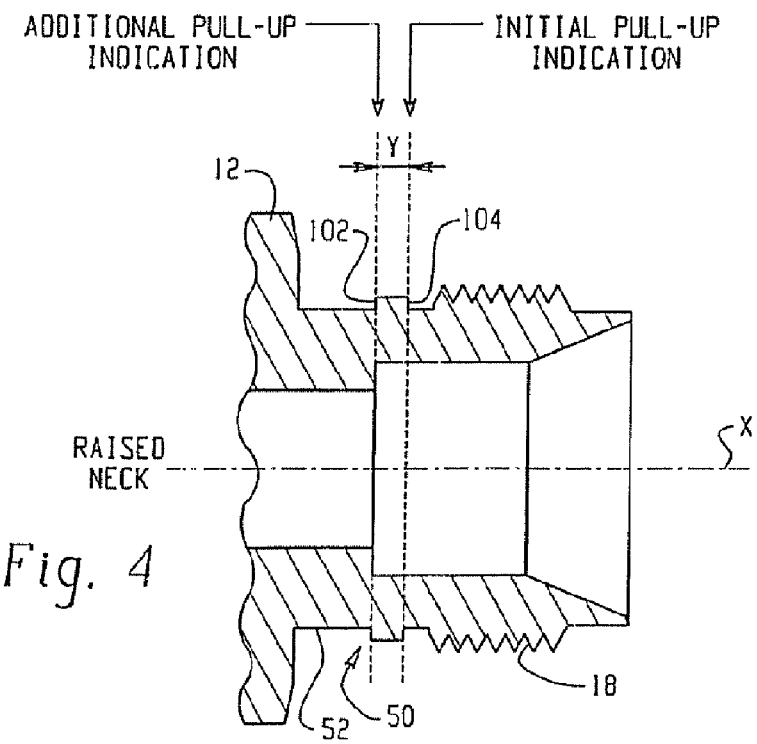
FIG. 4 illustrates an alternative embodiment in which a raised portion defines leading and trailing edges.

In the embodiment of FIG. 4, the raised portion 100 defines a leading edge 104 and the edge 102 is a trailing edge relative to the leading edge 104. The leading edge 104 is positioned so as to correspond to an initial proper pull-up position, and the trailing edge 102 is positioned and used to indicate to the assembler during subsequent remakes of the fitting that the nut has axially advanced a predetermined distance "Y" past the initial pull-up position. When the nut 14 aligns with the trailing edge 102, the assembler knows that the fitting 10 has been remade the number of times that corresponds to the predetermined axial distance of movement of the nut past the initial pull-up position.

It is important to note that in the various embodiments herein, although a marking 50 may be used to indicated the target initial pull-up position, precise alignment of the nut 14 with the marking is not required. The assembler, for example, may go past the initial pull-up position marking, either intentionally or inadvertently. Thus, the present invention contemplates that the leading edge of the marking, in the example of FIG. 1 for example, provides a visual indication to the assembler that if the nut 14 is installed at least to that position, then the initial pull-up position has been achieved. Therefore, the distance "Y" illustrated herein is not necessarily limited to the distance between two edges or demarcations of the marking 50, but more descriptively should be understood to be the distance of additional axial displacement of the nut 14 during remakes from the initial pull-up position, whether the initial pull-up position corresponds to precise alignment of the nut 14 with the target initial pull-up position 56 or to an initial pull-up position somewhat axially beyond the target position. Thus, for example, in FIG. 4, the axial length of the raised portion 100 provides a visual indication to the assembler that for initial pull-up the nut front end 14*a* should be advanced at least to the leading edge 104, but could also be advanced to a position within the axial length of the portion 100. The trailing edge 102 of the portion 100 thus being used as a visual indication of an additional axial displacement distance beyond the target initial pull-up position 56.

Figure 5:
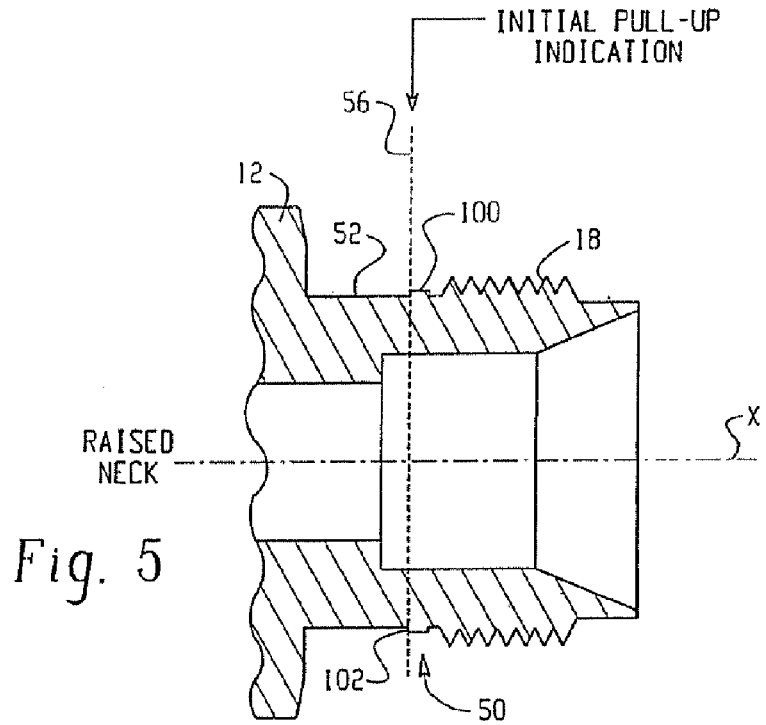
FIG. 5 illustrates a marking that is spaced from the body threads.

FIG. 5 is similar to FIG. 3 but with the raised portion 100 axially spaced from the body threads 18 for some sizes of fittings.

Figure 6:
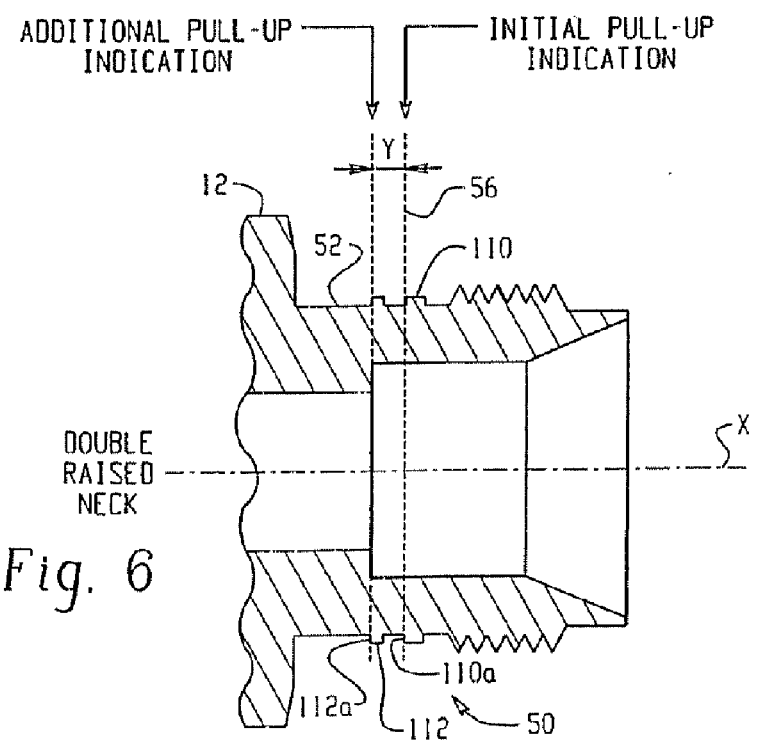
FIG. 6 illustrates a marking in the form of two raised portions.

In the embodiment of FIG. 6, the marking 50 two raised portions 110, 112 are formed on the body neck 52. The first or leading raised portion 110 is used to indicate the initial pull-up position, while the second raised portion 112 is used to indicate during subsequent remakes that the nut (not shown) has axially advanced a predetermined distance Y from the initial pull-up position 56. Note that in FIG. 6 the initial pull-up position corresponds to a trailing edge 110*a* of the raised portion 110 so that the raised portion 110 is substantially covered when the nut is in the initial pull-up position; and further that the additional pull-up position indication corresponds to a trailing edge 112*a* of the second raised portion 112 so that the second raised portion 112 is substantially covered when the nut has advanced axially a predetermined distance from the initial pull-up position. As with all the embodiments herein, the raised surfaces of the portions 110, 112 can be treated with color or roughening or otherwise to aid in the visual perception of the marking 50.

Figure 7:
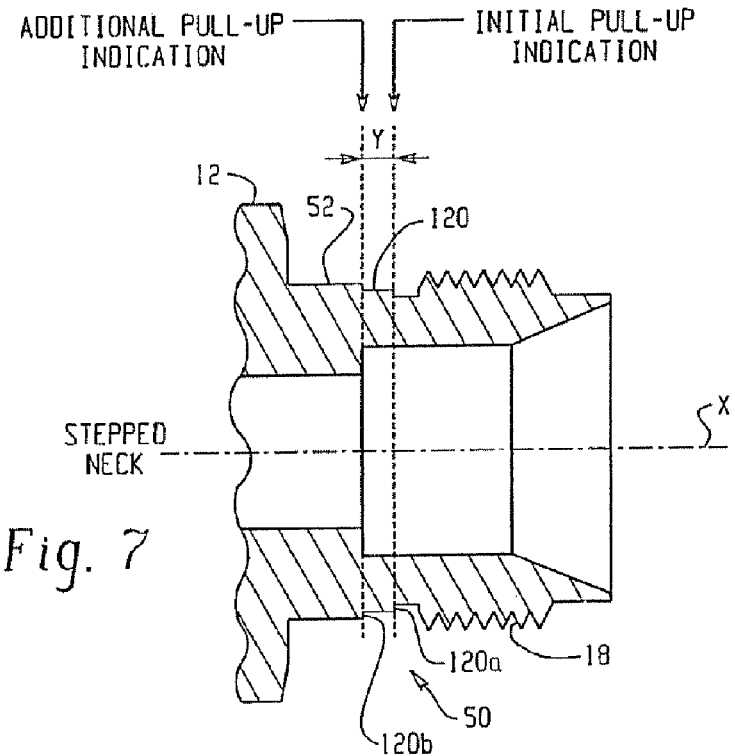
FIG. 7 illustrates a raised marking that is in the form of a step.

In the embodiment of FIG. 7, the marking 50 is realized in a manner similar to FIG. 4 except that the marking 50 is formed as a step 120 in the neck 52 of the body 12. The step 120 forms a leading edge 120*a* and a trailing edge 120*b* that are used for the initial pull-up position 56 and to indicate the distance Y during subsequent remakes of the fitting.

Figure 8:
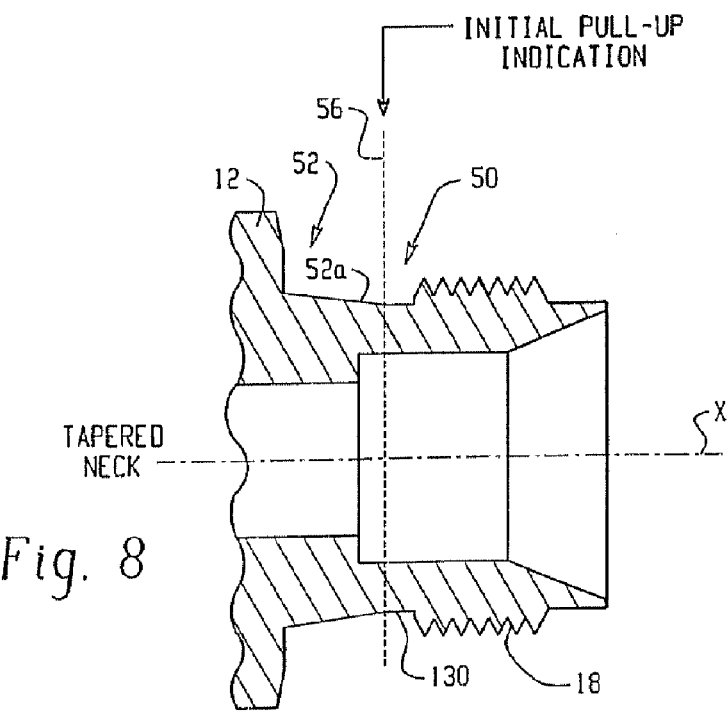
FIG. 8 illustrates a marking that is a cylindrical portion axially adjacent a tapered body neck.

In the embodiment of FIG. 8 the neck 52 of the body 12 is tapered axially as at 52*a*. The neck 52 tapers to a cylindrical portion 130 that in this embodiment is positioned adjacent the back end of the body threads 18. The marking 50 is thus realized in the form of the cylindrical portion 130 that is visually perceptible. The nut is advanced onto the body 12 until the marking 50 is substantially covered by the nut, thus indicating that the nut is in the initial pull-up position.

Figure 9:
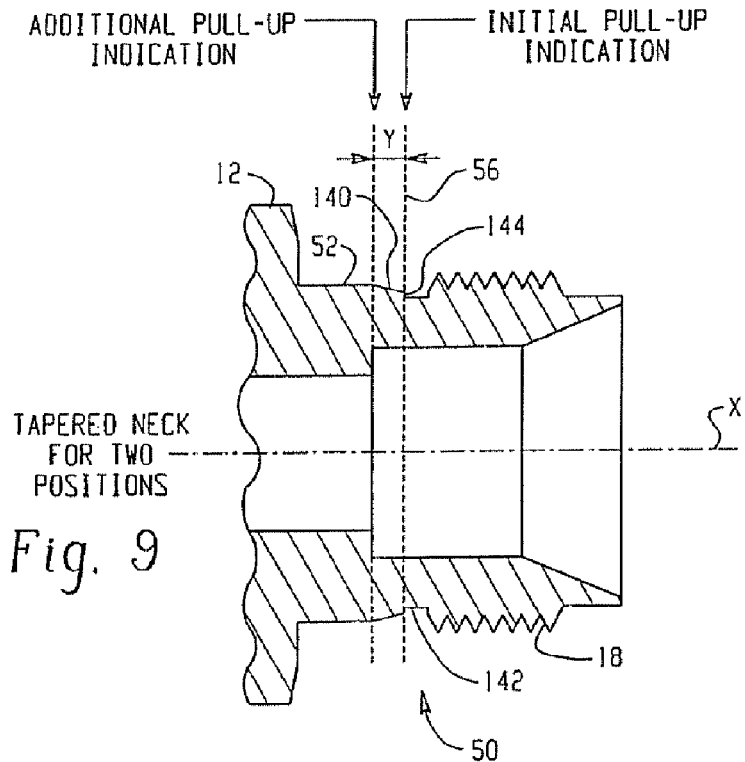
FIG. 9 illustrates a marking formed as a tapered portion of the body neck.

In the embodiment of FIG. 9, the neck 52 of the body 12 is tapered axially over a predetermined portion 140 of the neck 52. The tapered portion 140 is axially adjacent a groove 142 thus defining an edge 144 between the groove 142 and the tapered portion 140. The edge 144 corresponds to the initial pull-up position 56 so that the groove 142 is substantially covered by the nut 14 when the nut has been installed to the initial pull-up position 56. The axial extent of the tapered portion 140 defines the distance Y for further predetermined axial displacement of the nut 14 during subsequent remakes of the fitting, so that the tapered portion 140 is substantially covered by the nut when the nut has advanced the distance Y during subsequent remakes. The marking 50 in this embodiment thus comprises the groove 142 and the tapered portion 140.

Figure 10:
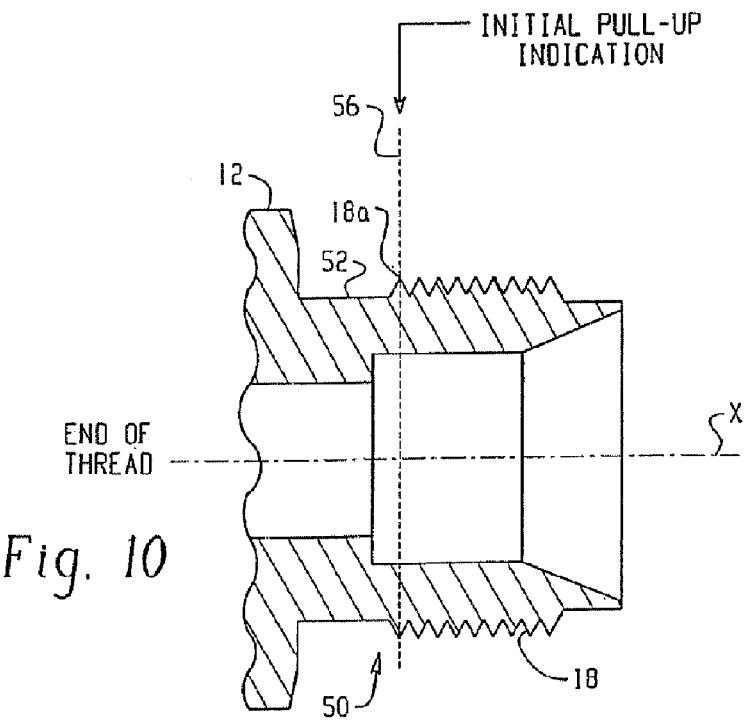
FIG. 10 illustrates use of threads as a marking.

In the embodiment of FIG. 10, the threads 18 of the body 12 are precisely machined so that the back end 18*a* of the threads 18 corresponds to the initial pull-up position 56. In this embodiment then, the marking 50 is realized in the form of the end of the threads 18.

Figure 11A:
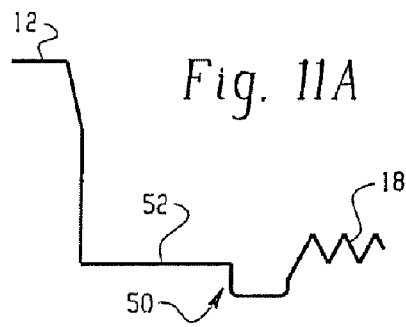
FIGS. 11A–H illustrate various marking groove profiles.
Figure 11E:
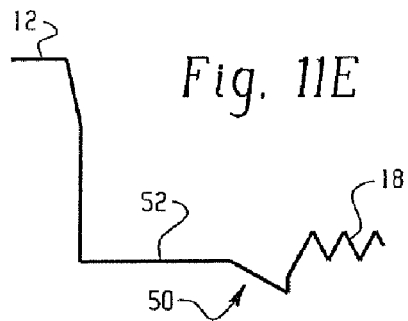
Figure 11B:
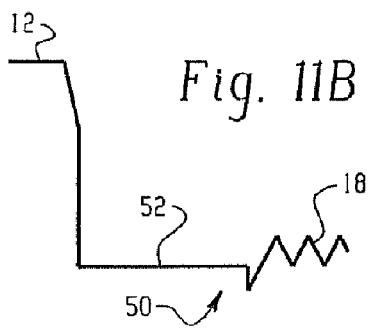
Figure 11F:
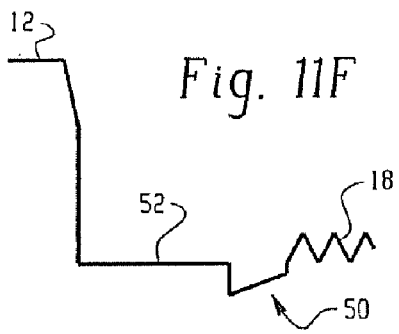
Figure 11C:
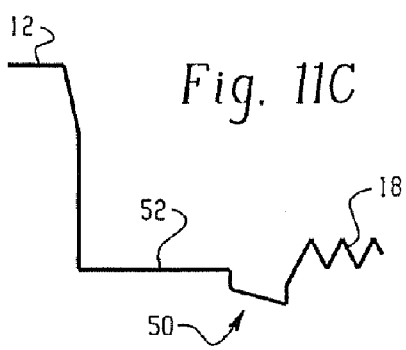
Figure 11G:
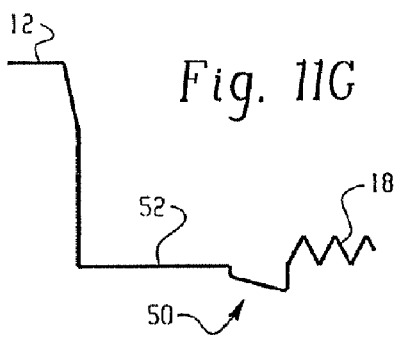
Figure 11D:
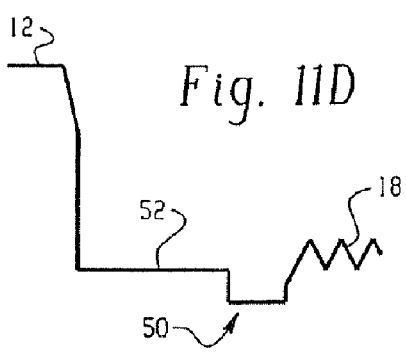
Figure 11H:
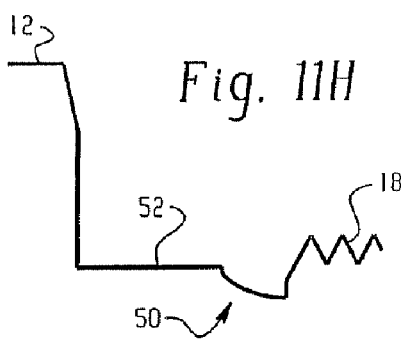

FIGS. 11A–11F illustrate various groove shapes or geometry formed in the neck 52 of the body 12 that can be used for the marking 50 in the various embodiments of the invention herein that use grooves. These are intended to be exemplary in nature to illustrate that the particular groove shape is not critical to the practice of the present invention. In particular, FIG. 11H illustrates a groove having an elliptical edge.

Figure 12:
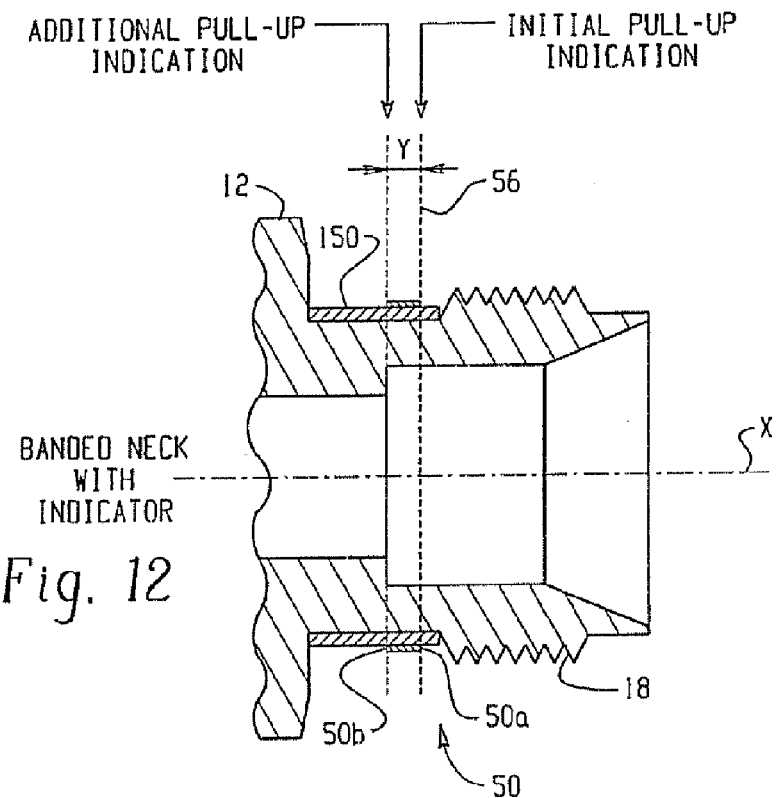
FIG. 12 illustrates a marking in the form of a band.
Figure 13:
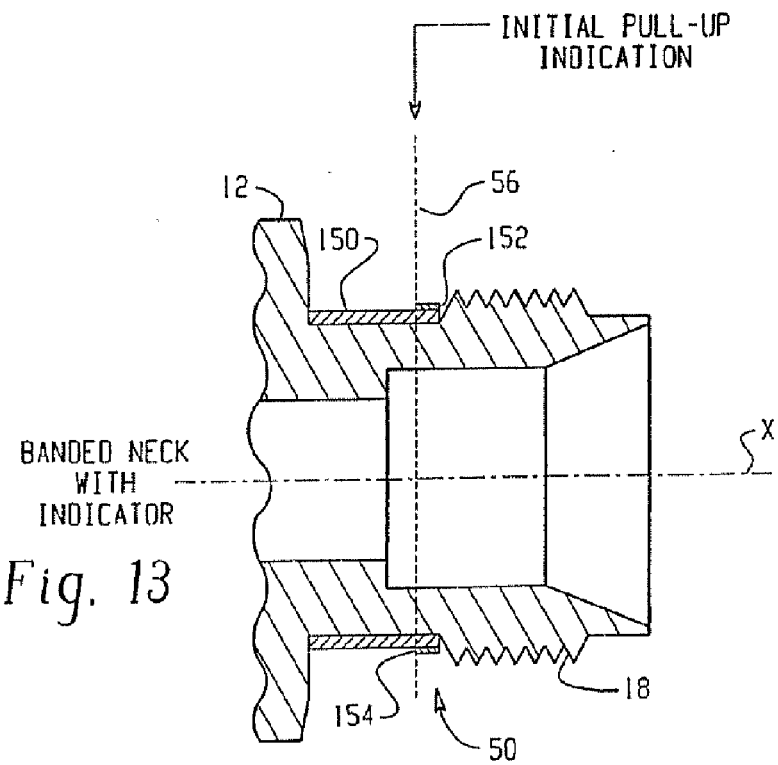
FIG. 13 illustrates a marking in the form of a band that has a raised lip or edge.
Figure 14:
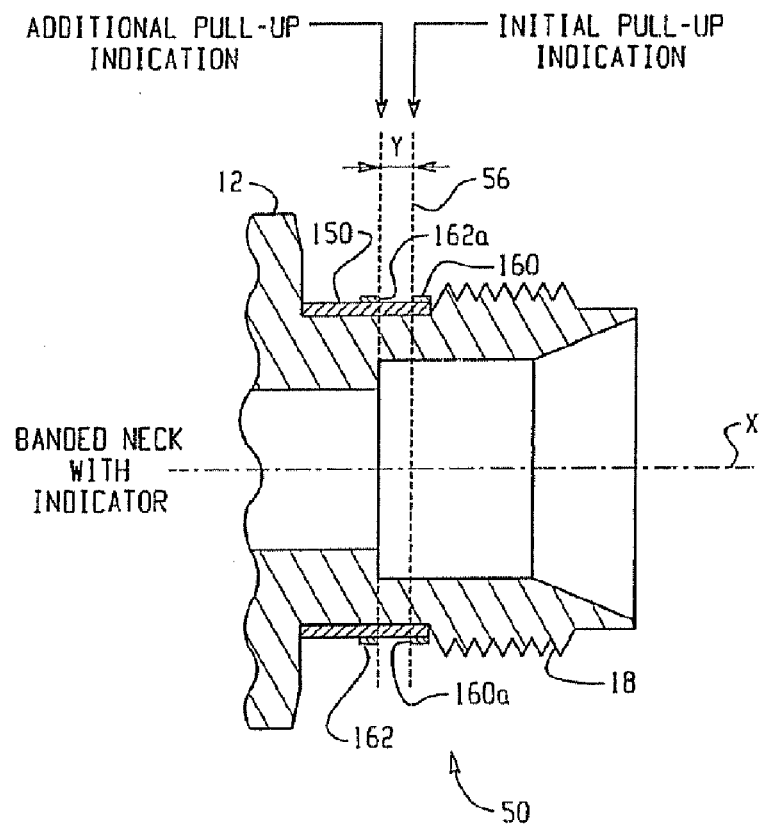
FIG. 14 illustrates a marking in the form of a band having two raised portions.

FIG. 12 illustrates an embodiment of the intrinsic gauge invention that uses a band that is installed on the neck of the body 12 rather than a machined groove or raised portion of the neck 52. The band 150 may be colored or otherwise visually perceptible, and is thin enough so that the nut 14 (not shown) can easily extend over the band 150. The band 150 includes a visually perceptible marking 50 that defines a leading and trailing edge 50*a* and 50*b* to correspond with the initial pull-up position 56 and a predetermined axial distance Y of movement of the nut during subsequent remakes. FIG. 13 illustrates another version of this concept in which the band 150 includes a raised lip 152 that defines an edge 154 that corresponds to the initial pull-up position 56 of the nut 14. FIG. 14 illustrates another embodiment in which the band 150 includes first and second raised portions 160, 162. These raised portions 160, 162 define corresponding edges 160*a* and 162*a* that indicate the initial pull-up position 56 and the predetermined axial distance Y during subsequent remakes, respectively. Again, as noted herein before, the distance Y can correspond to the axial distance between the initial pull-up target position 56 and the additional axial displacement position (50*b* in FIG. 12 or 162*a* in FIG. 14, for example) or can correspond to axial distance between the actual initial pull-up position the nut 14 is turned to on the body 12 and the additional displacement position.

Figure 15:
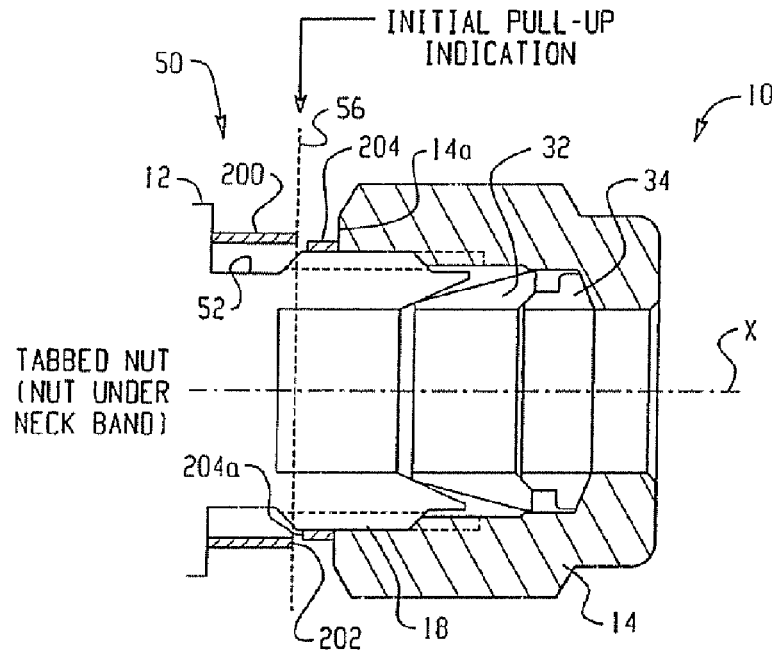
FIG. 15 illustrates a marking in the form of two portions that overlap in a predetermined manner.

FIG. 15 illustrates another embodiment of the invention. In this example, a generally cylindrical body band or sleeve 200 is attached to the fitting body 12. The body band 200 extends axially to a position 202 that is precisely determined to correspond to the initial pull-up position 56 of the nut 14 on the body 12. The fitting nut 14 includes a nut tab 204 that is attached to the forward end of the nut 14*a*. The nut tab 204 is formed with an outer diameter that is less than the inner diameter of the body band 200 and has a rear end 204*a*. As the nut 14 is advanced onto the body threads 18 by relative rotation between the nut 14 and the body 12, the nut tab 204 advances toward the body band 200. When the tab back end 204*a* aligns with the forward end 202 of the body band 200, the assembler knows that the nut 14 is in the initial pull-up position. Optionally, the axial dimension of the tab 204 can be predetermined to correspond to the axial distance Y that the nut advances during subsequent remakes of the fitting 10. In this alternative situation, the nut 14 is advanced during subsequent remakes until the forward end 202 of the body band 200 covers the tab 204 or hits the forward end 14*a* of the nut 14.

Figure 16:
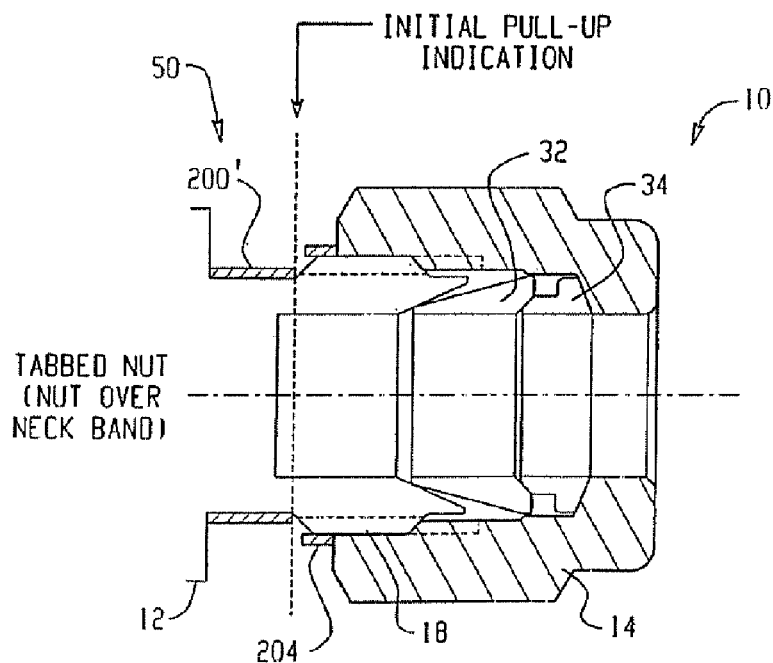
FIG. 16 illustrates a marking in the form of overlapping bands in which a larger diameter band slides over the other.

In the embodiment of FIG. 16, the nut tab 204' is dimensioned with an outer diameter that is greater than the outer diameter of the body band 200. In this case, as the nut 14 is advanced onto the body 14 threads, the tab 204' can slide over the body band 200'. Initial pull-up position is indicated when the tab 204' aligns with the forward end 202' of the body band 200.

In the embodiments of FIGS. 15 and 16, the bands 200, 200' can be made of metal such as stainless steel for example. The bands can be attached to or machined from the body 12. The nut tabs 204, 204' can also be machined as part of the nut 14.

Figure 17:
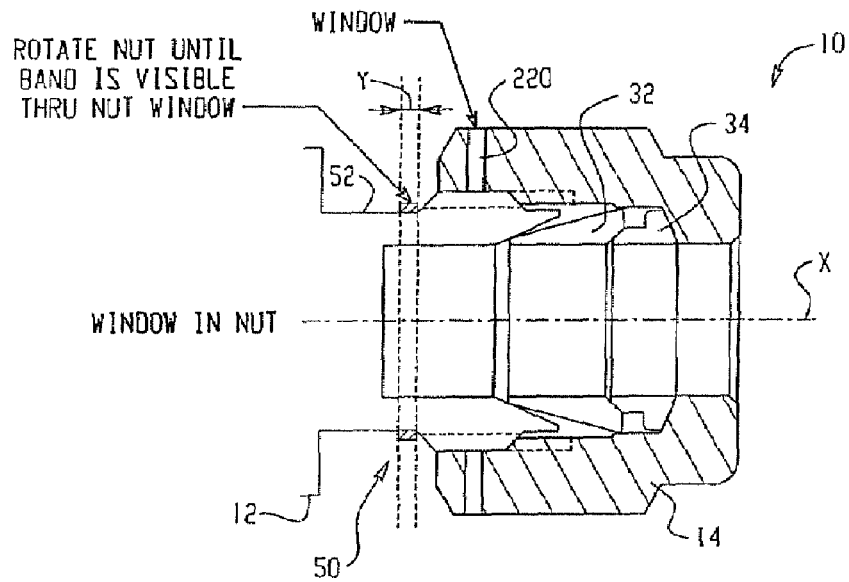
FIG. 17 illustrates the use of a viewing window to observe the marking.

In another embodiment illustrated in FIG. 17, the marking 50 is positioned on the body 12 adjacent the threads 18. The marking 50 may be a band or a machined surface, groove or other suitable marking that is visually perceptible. Preferably the marking 50 extends continuously and circumferentially about the body neck 52. In this example, a radial viewing window 220 is provided through the nut 14. The nut 14 is installed onto the nut body 12 until the marking 50 is first visible in the window 220. This position corresponds to the initial pull-up position. The axial length of the marking 50 can also be selected to correspond to a predetermined axial displacement Y of the nut 14 during subsequent remakes of the fitting 10. When the nut 14 advances to a point where the marking 50 is no longer visible in the window 220, then the assembler knows that the nut 14 has been axially advanced the predetermined distance Y.

In the embodiments described thus far, the intrinsic gauge is realized in the form of a marking 50 having one or more demarcations that are initially visually perceptible and that become visually aligned or imperceptible at the initial pull-up position or the additional axial displacement position. The general concepts of the present invention can also be realized in alternative ways that incorporate additional features of the fitting 10. These alternative embodiments are also referred to herein as intrinsic gauging because they can be incorporated into the fitting assembly 10 and used without the need for a separate or external gauging tool.

Figure 18:
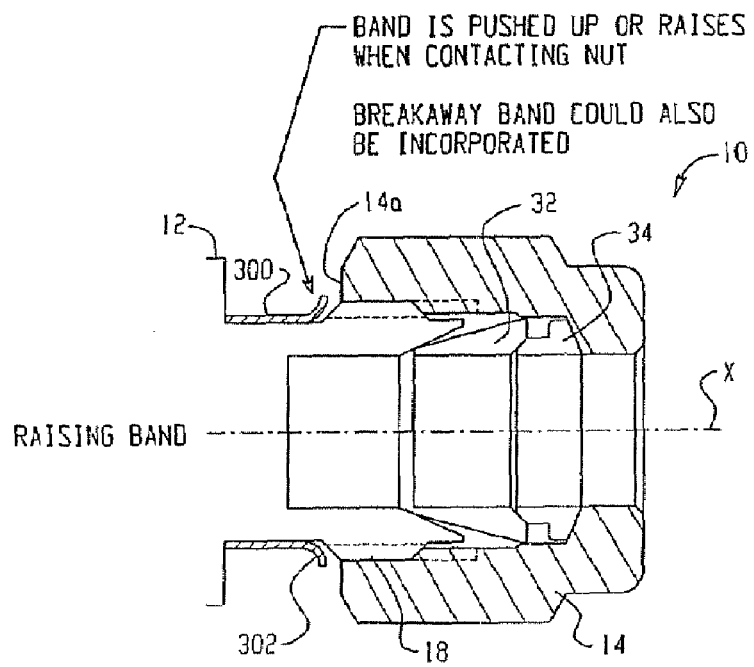
FIG. 18 illustrates a band that changes shape as a visual indication marking.

With reference to FIG. 18 then, a raised band 300 such as a metal stamping is positioned on the body neck 52. The free end 302 of the band 300 is raised so that the forward end 14a of the nut 14 engages with the band 300 and displaces it when the nut 14 has reached the initial pull-up position 56. The band 300 may also be made to break away when the nut 14 reaches the initial pull-up condition or when the nut 14 has been further advanced axially a predetermined distance Y during subsequent remakes of the fitting.

Figure 19:
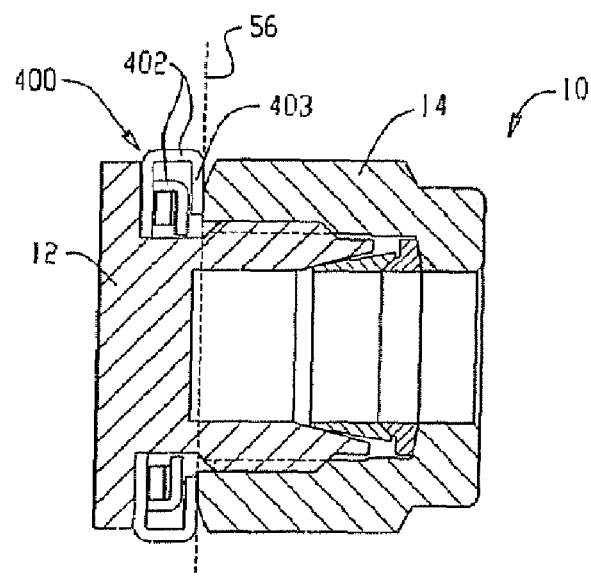
FIGS. 19, 19A and 19B illustrate a marking in the form of collapsible tabs.
Figure 19A:
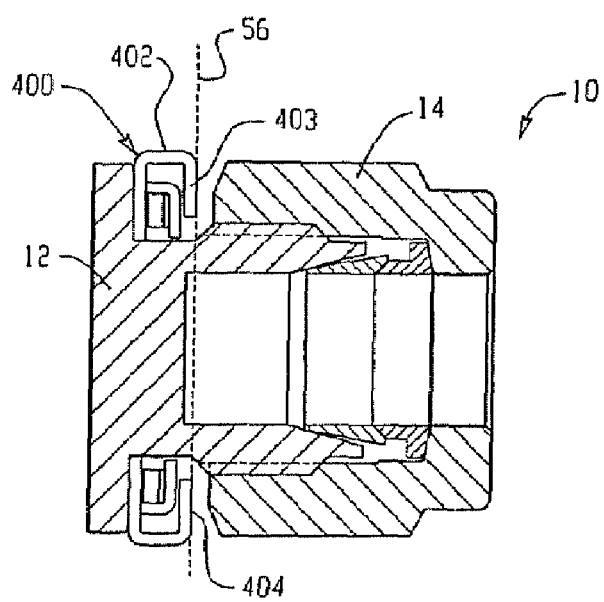

With reference to FIG. 19, the present invention may be realized using collapsible tabs. In this example, an indicator ring 400 (FIG. 19B) is installed on the body 12 about the neck 52. The indicator ring 400 includes a plurality of axially extending tabs 402. Each tab 402 includes in this example a radial flange 403. The forward face 404 of each flange 403 is precisely position to correspond with the initial pull-up position 56 for the nut 14.

Figure 19B:
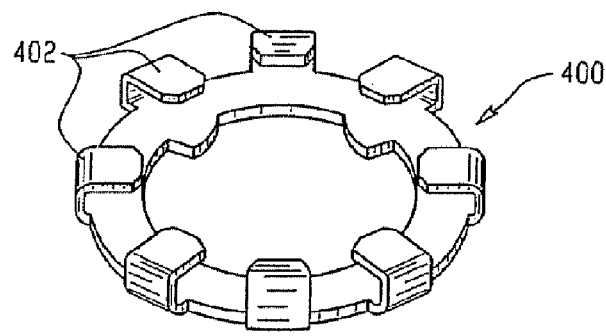

For initial pull-up, the nut 14 is installed onto the body 12 until the forward end 14a of the nut 14 contacts or aligns with the forward face 404 of the tabs 402 (FIG. 19B). Over make is avoided by the visual indication to the assembler that the nut 14 has contacted the ring 400, specifically the flanges 403. If the nut 14 continues to be turned relative to the body 12, the tabs 402 will begin to be collapsed or bent inwardly. This compressing of the tabs 402 can be used as an indicator of the additional axial displacement distance Y during subsequent remakes if so required. In such case, during subsequent remakes, the additional axial advancement of the nut 14 onto the body 12 will cause further compression or collapse of the tabs 402. Complete compression of the tabs 402 can be used as a visual indication that the nut 14 has advanced a distance Y beyond the initial pull-up position 56.

Figure 20:
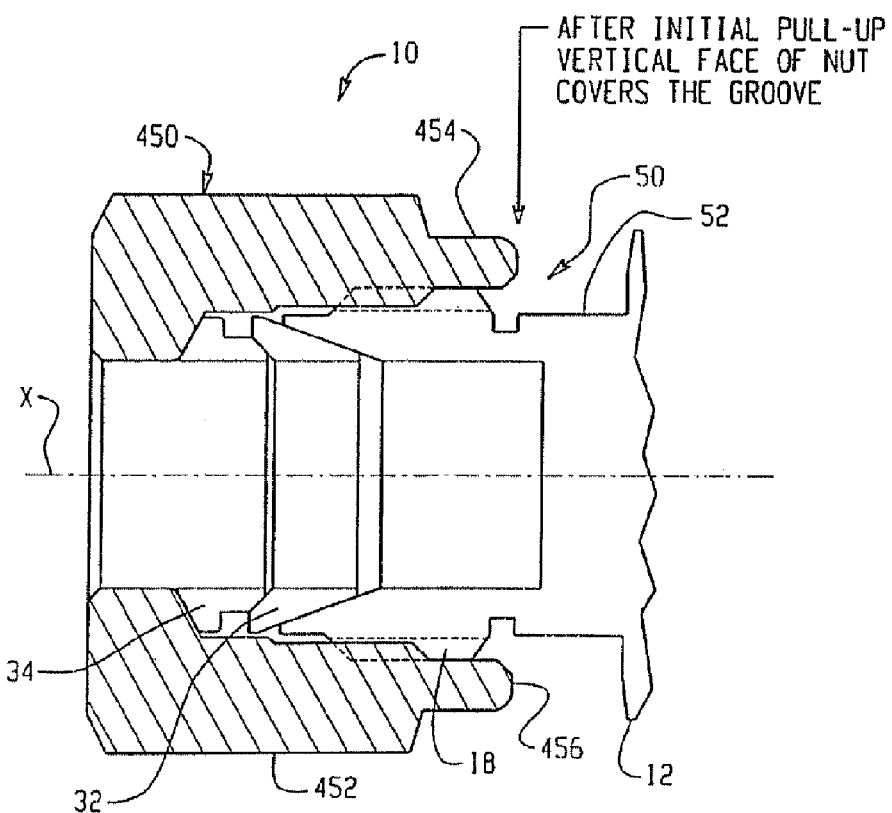
FIG. 20 illustrates an alternative embodiment that uses a modified nut.

With reference to FIG. 20, the invention is illustrated in use with a modified nut 450. All aspects of the fitting 10 and the marking 50 are the same as the embodiment of FIGS. 1 and 2 for example, but the nut 450 has been modified so that the hex faces 452 are formed on the tube end of the nut rather than the body end. In this manner, the nut 450 has a reduced diameter 454 adjacent the region of the marking 50, making the marking easier to visually detect and also improving visual accuracy of determining alignment of the nut end 456 with the marking 50.

Figure 21A:
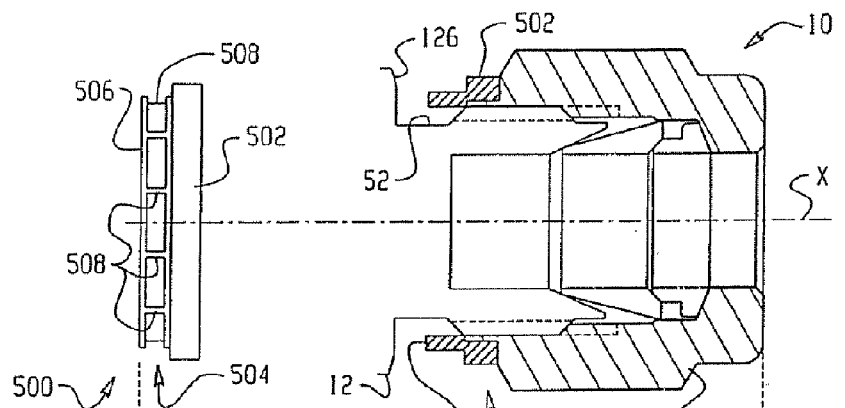
FIGS. 21A–F illustrate an embodiment that uses a collapsible ring.
Figure 21B:
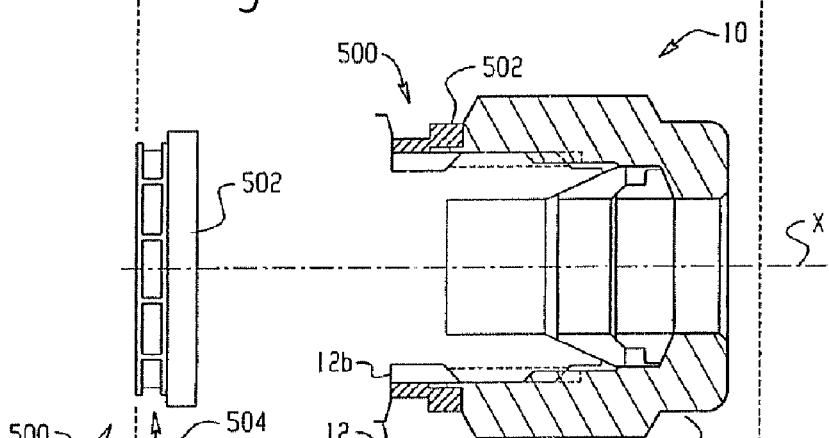
Figure 21C:
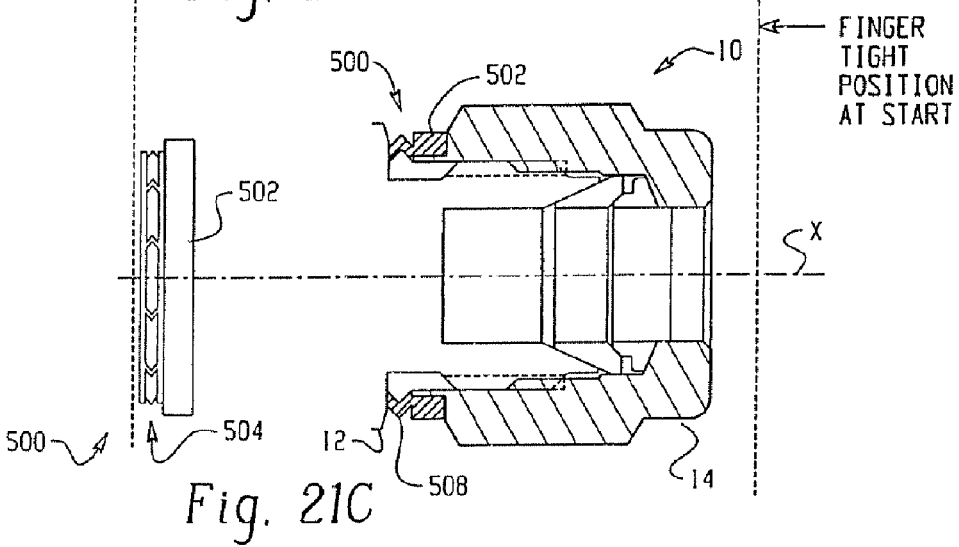

FIGS. 21A–C illustrate another embodiment of the invention that uses an attachable ring 500. The ring 500 is preferably metal and can be attached by any suitable method. The ring 500 is characterized by a rigid body 502 and a compressible or collapsible portion 504. The compressible portion 504 in this example includes a thin wall 506 attached to the rigid body 502 by a number of thin web-like legs 508. The legs 508 can be formed by machining holes in a cylindrical wall of the collapsible portion 504.

FIG. 21A illustrates the fitting 10 in the finger tight position. In FIG. 21B, the nut 14 has been installed onto the body 12 to a position whereat the forward wall 506 contacts a forward face 12b of the body 12. This may be used as the initial pull-up position. During subsequent remakes the thin webs 508 will collapse as the nut is axially advanced further with each remake, as illustrated in FIG. 21C. Complete compression of the legs 508 can be used as a visual indication of the additional axial displacement position for the assembler and can also be used as a positive stop to prevent further remakes if so required.

Figure 21D:
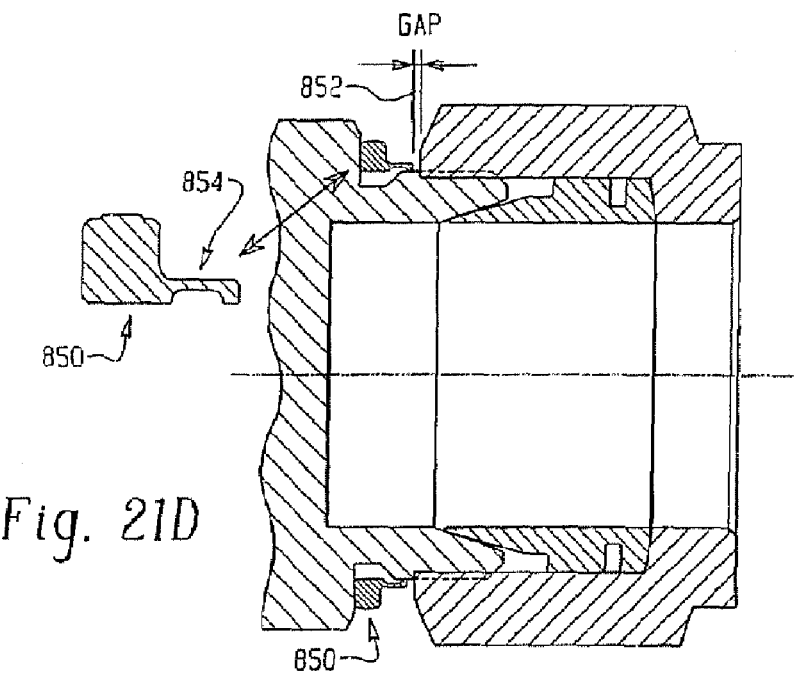
Figure 21E:
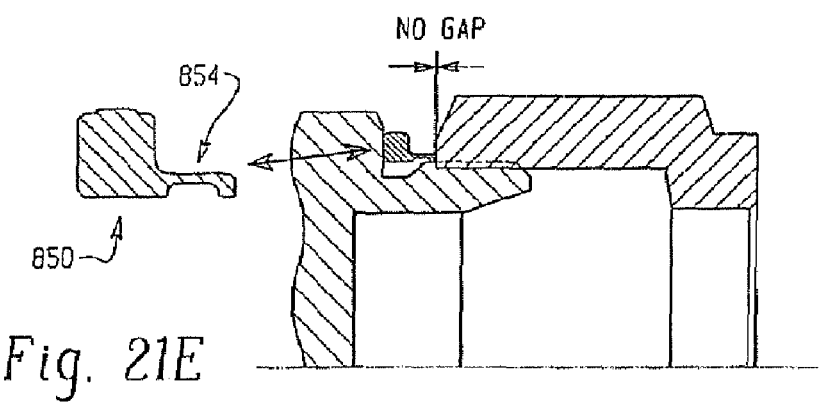
Figure 21F:
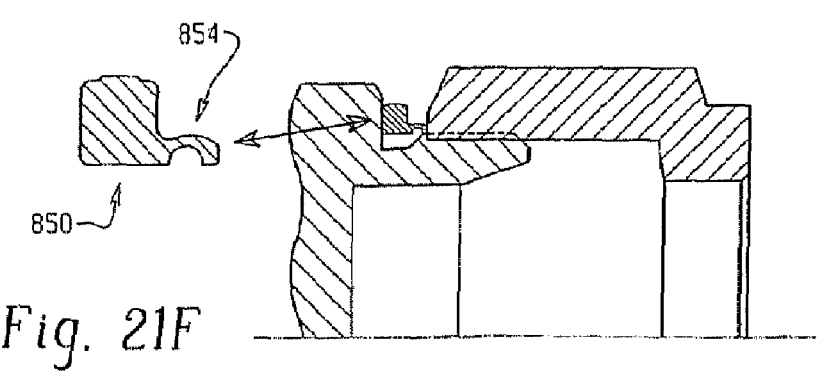

In the embodiment of FIGS. 21D–F, a compressible stop collar 850 is installed on the body 12 in a manner that allows the collar 850 to spin freely when the fitting has not been made up, such as, for example, by allowing for an axial gap 852 between the collar 850 and the nut 14 before the nut 14 is installed to the finger tight position (FIG. 21E). In FIG. 21E, the nut 14 has been installed to the finger tight position such that a forward wall 14a of the nut touches the collar 850. This contact between the nut 19 and the collar 850 prevents or restricts the collar 850 from spinning freely and can thus be used as an indication of proper initial pull-up. Upon subsequent remakes, as illustrated in FIG. 21F, as the nut 14 further advances axially beyond its initial pull-up position, the collar 850 includes a thin extension or series of tabs 854 that are crushed or otherwise collapse at a predetermined axial advance of the nut 14. For clarity the ferrules are omitted from FIGS. 21E, F.

Figure 22:
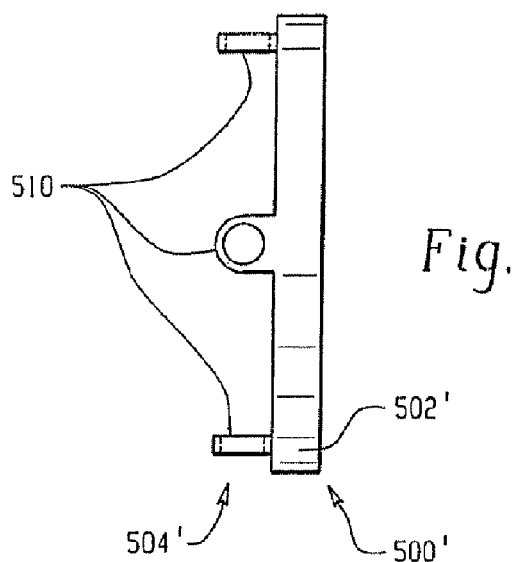
FIG. 22 illustrates a ring that uses collapsible tab extensions.

FIG. 22 illustrates another embodiment for the collapsible portion 504'. In the example of FIG. 22, the collapsible or compressible portion 504' of a ring 500' is realized in the form of a series of tab extensions 510 that axially extend from the main body 502'. These tabs 510 collapse as they engage the body 12 during initial make-up of the fitting 10.

Figure 23A:
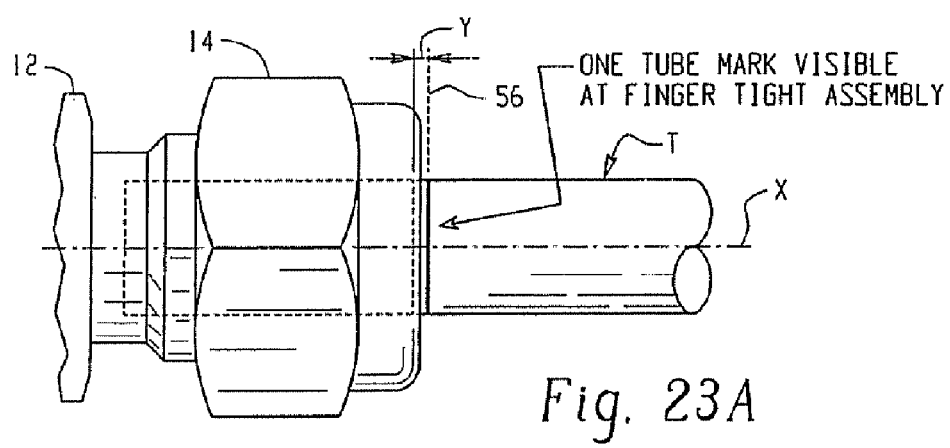
FIGS. 23A and 23B illustrate an embodiment in which the marking is formed on the tubing.
Figure 23B:
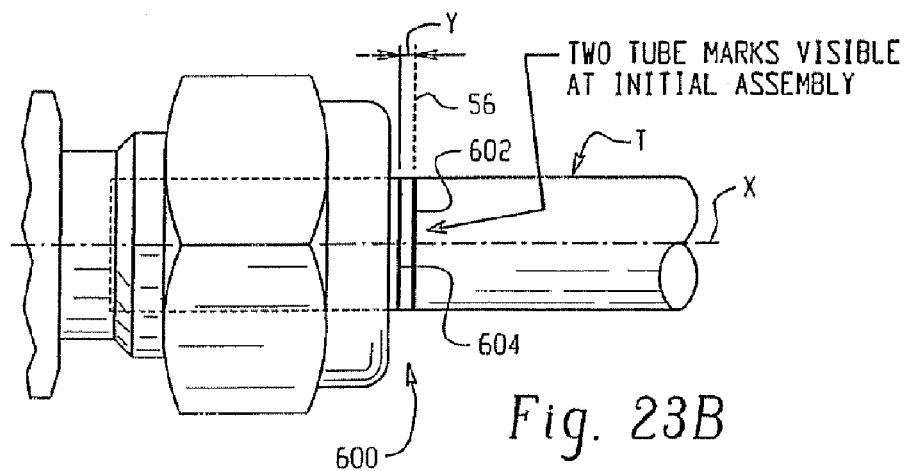

With reference to FIGS. 23A and 23B, in another form of the invention, the initial pull-up position 56 and the additional axial displacement position (and distance Y) are visually indicated using a marking 600 on the tubing T. In this example, the marking 600 is realized in the form of two demarcations or lines 602 and 604. The demarcations 602, 604 may be formed into the tubing wall 606 or applied in the form of a band, painted line and so forth. In the finger tight position, both lines 602, 604 are hidden from view to the assembler by the nut 14. The first line 602 is positioned such that during initial pull-up the nut 14 is advanced onto the body 12 until the first line 602 is visible, as illustrated in FIG. 23A. the second line 604 is positioned such that during subsequent remakes the second line becomes visible after the nut 14 has been advanced an additional axial displacement Y beyond the initial pull-up position 56.

Figure 24:
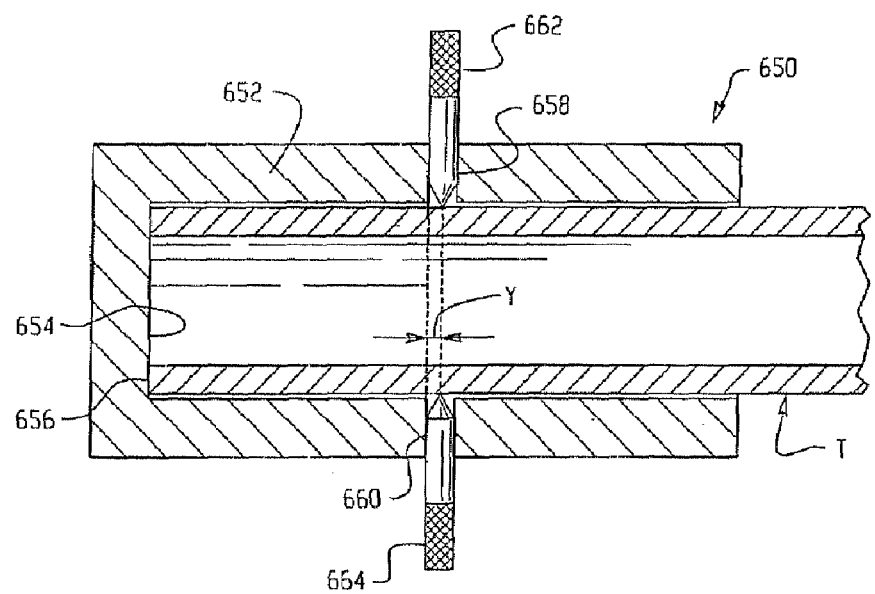
FIG. 24 illustrates a marking tool for the embodiment of FIG. 23.

FIG. 24 illustrates a suitable tool 650 for marking the tubing T in accordance with the embodiment of FIGS. 23A and B. The tool 650 is realized in this example in the form of a hollow single ended cylindrical sleeve 652. The sleeve includes a rear wall 654 against which a tube end 656 is bottomed. A pair of radial holes 658, 660 are formed in the sleeve 652 and receive respective marking tools 662, 664. The tools 662, 664 are axially separated a predetermined distance Y. as the tubing T is rotated within the sleeve 652, the tools 662, 664 scratch or otherwise form lines in the surface of the tubing T to correspond with the lines 602, 604 described herein with respect to FIGS. 23A and 23B.

Figure 25:
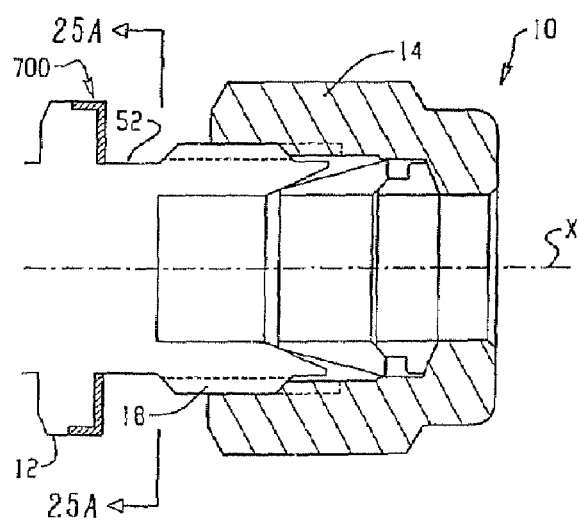
Figure 25A:
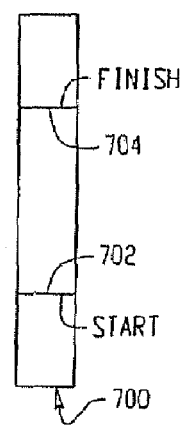

With reference to FIG. 25, in this embodiment of the invention, a position indicator band 700 is attached to the nut body 12. This band includes a "start" position identifier 702 and a "finish" position identifier 704. The nut 14 is initially installed onto the body 14 to the finger tight position. The nut 14 is then marked in a suitable manner, either at the manufacturer or by the assembler. The alignment mark (not shown) on the nut is applied to the nut so as to axially align with the start position indicator 702, and typically may be applied to the forward face of the nut 14a or to one of the hex faces on the nut body. The nut is then rotated relative to the body for the prescribed number of full and partial turns, wherein the nut 14 is rotated until the nut alignment mark is axially aligned with the finish position indicator 704. Although this technique requires the assembler to keep track of the full and partial turns, final pull-up position is more accurately achieved since there are well defined starting and stopping position indicators. FIG. 26 illustrates an example wherein the indicator band 700' is installed on the nut 14. When the fitting 10 is assembled to the finger tight position, an alignment mark is applied to the body 12 in axial alignment with the start position identifier 702' on the band 700'. The nut 14 is then relatively rotated the prescribed number of full and partial turns until the alignment mark on the body 12 axially aligns with the finish position identifier 704' on the band 700'.

With reference to FIGS. 27 and 28, the invention is illustrated in use with a T fitting 800. The fitting 800 includes a main body 802 with three identical fitting ends 804. In this example, each fitting end 804 includes a marking 50 in accordance with the invention, although it is not necessary that all three ends have the marking 50.

As best viewed in FIG. 28, the marking 50 is realized in the form of a groove 806 machined into the neck portion 22 of each fitting end 804. The groove leading edge 808 is axially spaced from the last thread 18a of the threaded end 18, thus forming a step 810. The trailing edge 812 may be used to indicate an additional axial displacement of the nut 14 (not shown) during subsequent remakes. In this case, as with the other examples herein, the initial pull-up position 56 is indicated by aligning the forward end of the nut 14 with the leading edge 808 of the groove 806, or may simply be specified as the forward end of the nut 14 axially aligning anywhere within the groove 806 area.

Figure 29:
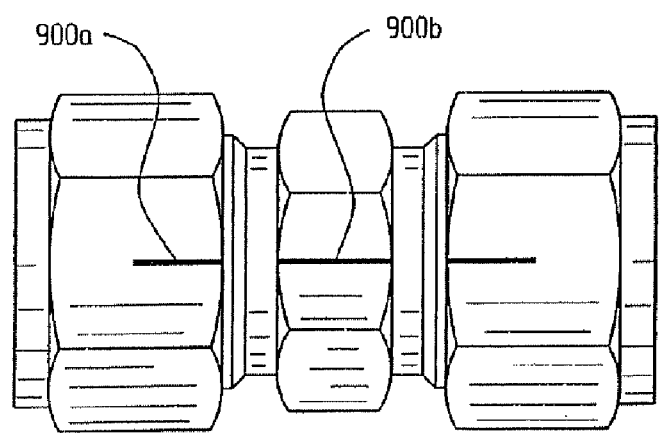
FIG. 29 illustrates another embodiment using laser etching.

FIG. 29 illustrates another embodiment in which line markings 900a and 900b are applied to the nut 14 and body 12 after the fitting has been assembled to the finger tight position. The line markings 900 may be formed by any suitable method including laser etching. The fitting may be disassembled by the user for installation and then re-made to the finger tight condition with the markings 900a,b aligned. Afterwards, initial pull-up is verified by rotating the nut a full turn until the markings are again in alignment. This embodiment is particularly suited for fittings that utilize a single full turn for initial pull-up. The line markings 900a,b may be used in combination with other markings such as a groove to indicate additional axial displacement beyond initial pull-up during subsequent re-makes.

Figure 30A:
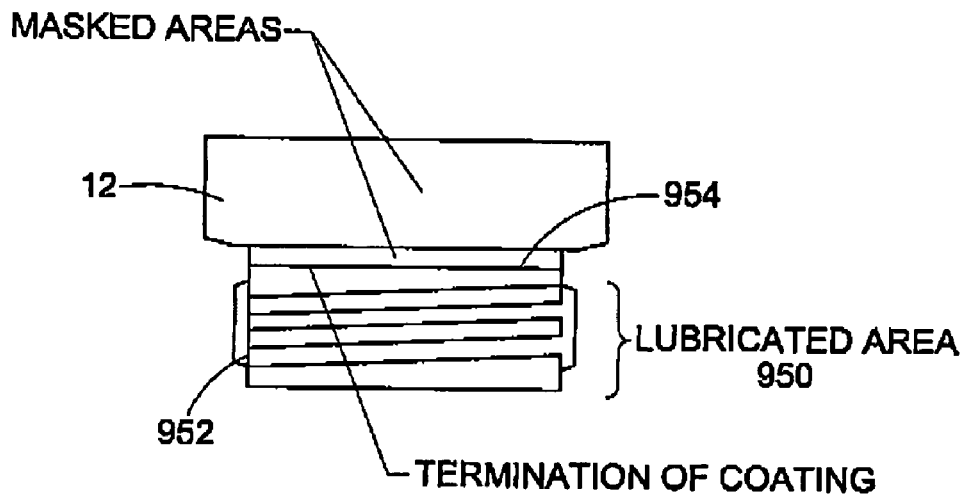
FIGS. 30A and 30B illustrate additional embodiments of the invention.
Figure 30B:
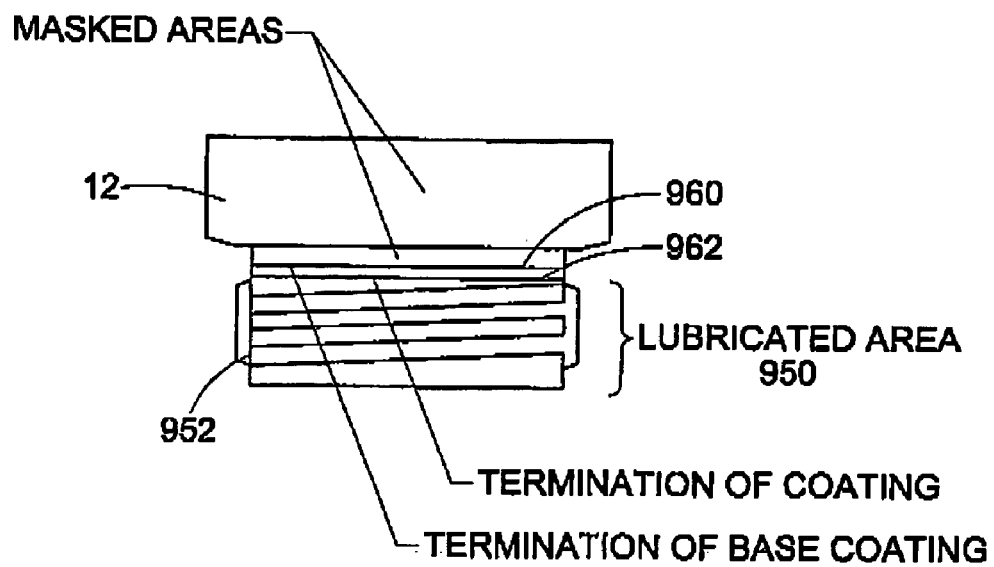

With reference next to FIGS. 30A and 30B, in accordance with another aspect of the invention, the visually perceptible marking 50 may be realized in the form of a material applied to the male threaded body 12, as distinguished from a physical feature added to or incorporated into the body 12. In one embodiment, the material may be a lubricant 950 such as is commonly used to reduce torque and galling during pull-up of the fitting. Suitable lubricant materials include but are not limited to tungsten or molybdenum disulfide. As illustrated in the embodiment of FIG. 30A, the lubricant 950 is applied typically to the male threads 952. In accordance with the invention, the lubricant 950 is applied up to a predetermined termination point 954 that corresponds to a proper initial pull-up position of the female nut 14. A suitable masking layer is used to prevent application of lubricant to areas such as the hex. The mask is subsequently removed after the lubricant is applied. The mask further can be used to provide a well-defined line or edge for the termination point 954. The nut 14 (omitted from FIG. 30A and FIG. 30B for clarity) is axially threaded onto the body 12 until the leading edge 14a of the nut is at least axially adjacent or slightly past the end 954 of the lubricant coating. Typically the lubricant is a distinctly different color from the material of the body 12 and therefore easily perceived visually.

In some cases, a surface activation step may be performed prior to adhering the lubricant 950 to the body 12. Such activation steps are well known to those skilled in the art. The activation step likewise provides a perceptible discoloration. An embodiment is illustrated in FIG. 30B wherein the activation step is applied to the unmasked threads 952 and body 12 to a first location 960. The lubricant 950 is then applied up to a termination point 962, thus leaving a band between the termination points 960 and 962. Thus, two demarcations are provided whereby the first demarcation 962 may correspond to an initial pull-up position of the nut 14 onto the body 12, and the second demarcation 960 corresponds to an additional predetermined axial displacement of the nut 14 onto the body 12 beyond the initial pull-up position.

In both embodiments that use a lubricant, silver plating of the threads may be reduced or eliminated since a lubricant coating has been applied to the fitting threads. In the embodiment of FIG. 30B as well as similar embodiments described herein above that use a colored band as a marking 50, the band can be realized by first applying a suitable colorized material to the body 12 up to the outer line or termination point 960. The colorized material can then be removed by any suitable process, such as chemical etching for example, to the termination point 962, thus providing the colored band between the termination points 960 and 962.

Figure 31:
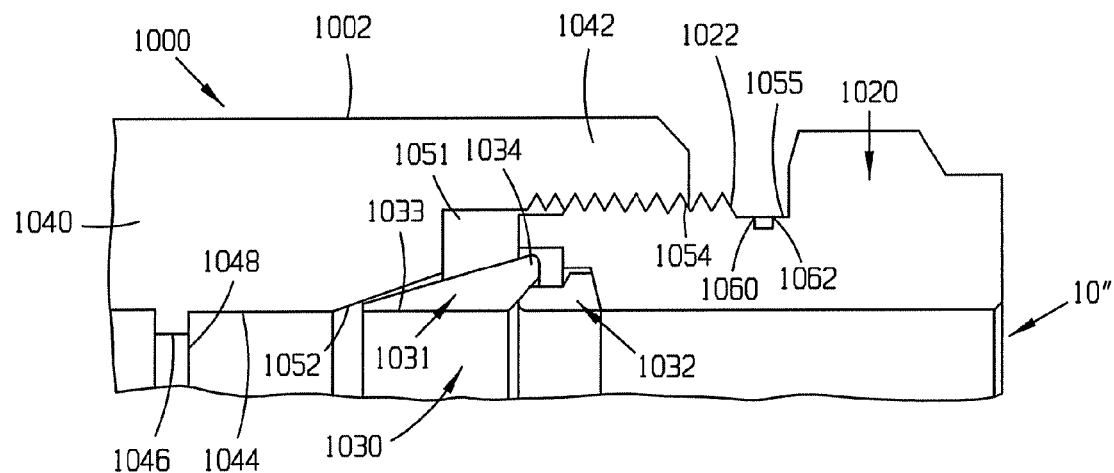
FIG. 31 illustrates another embodiment employing a female-type coupling assembly.

In another embodiment of the present invention, the intrinsic gauging is used to provide proper pull-up indication on female-type fittings. An example of such a fitting is described in U.S. Pat. No. 4,826,218 issued on May 2, 1989 for COUPLING DEVICE FOR HEAVY-WALLED TUBULAR MEMBERS, the entire disclosure of which is hereby incorporated by reference. As shown in FIG. 31, the fitting assembly 10' includes a coupling body 1000 having an associated tubular member 1010, a coupling nut 1020 and a ferrule arrangement 1030. The coupling body or member 1000 has a first end 1040 and a second end 1042 axially spaced therefrom. It will be understood that the coupling body 1000 may take any number of forms, such as, for example, a union, tee, cross, or elbow, and may be provided directly on a valve, filter, instrument or the like. It should also be appreciated that the coupling body 1000, or coupling nut 1020, may include one or more hardened portions, such as those that are work hardened by rolling threads (not shown) on the exterior surface 1002 of the coupling body 1000.

A first or inner bore 1044 is coaxial with a through passage 1046 and defines a radial shoulder 1048 against which a first or inner end 1050 of the tubular member 1010 abuts upon axial insertion into the coupling. A second or outer counterbore 1051 coaxial with inner bore 1044 is defined adjacent an axially outer end of the coupling body. A tapered camming mouth or surface 1052 intersects the inner bore 1044 with the outer bore 1051. An interiorly threaded region 1054 is defined adjacent the second end 1042 of the coupling body 1000, and is coaxial with inner bore 1044. This threaded region cooperates with a coupling nut to effect sealing and gripping engagement of the associated tubular member.

The ferrule arrangement 1030 may include one or more ferrules, a first or front ferrule 1031 and a second or rear ferrule 1032 are shown in FIG. 31. In this arrangement, the nose 1033 of the front ferrule 1031 is adapted for cooperating engagement with the tapered camming surface 1052. Likewise, an axially outer end 1034 of the front ferrule 1031 is adapted for abutting engagement with the rear ferrule 1032. It should be appreciated, however, that this is merely an example of a ferrule arrangement and that other ferrule arrangements, including, but not limited to, single ferrule arrangements can be used.

The coupling nut 1020 includes a threaded portion 1022 with cooperates with the threaded region 1054 of the coupling member 1000. In the embodiment shown in FIG. 31, intrinsic gauging is added to the coupling nut 1020, such that proper pull-up of the coupling nut onto the coupling member 1000 can be detected. As shown, the intrinsic gauging is two demarcations located on the neck 1055 of the coupling nut 1020. A first demarcation 1060 represents a leading edge and a second demarcation 1062 represents a trailing edge. It should be appreciated that the intrinsic gauging can take a variety of forms, such that a visibly perceptible marking is viewable on the coupling nut 1020. Examples of such other intrinsic gauging includes, but is not limited to, an etching, a recess, knurling, a colored region, a colored band, a groove, a colored groove, or a band, ring or other attachable object that would not interfere with pull-up of the nut.

The intrinsic gauging shown in FIG. 31 can function in three different fashions. The first intrinsic gauging configuration uses the first marking, demarcation, or leading edge, 1060 as the finger-tight position of the nut 1020 on the coupling 1000 and the second marking, demarcation, or trailing edge, 1062 as the proper pull-up initial position of the nut 1020 on the coupling 1000. Using this configuration, a user knows that the fitting assembly 10' has been properly pulled-up when the intrinsic gauging becomes substantially imperceptible. For example, if the intrinsic gauging is a groove, the nut 1020 will be properly pulled-up onto the coupling member 1000 when the groove becomes substantially imperceptible. The fitting assembly can be designed such that there is a predetermined axial length beyond the proper initial pull-up position to allow for subsequent remakes of the fitting. In these embodiments, the fitting assembly is properly made up at any point beyond the covering of the intrinsic gauging, but does not necessarily provide information regarding the maximum pull-up on the subsequent remakes. In the second intrinsic gauging configuration, the first demarcation represents the proper initial pull-up position, while the second demarcation represents the predetermined axial length beyond the proper initial pull-up position to allow for subsequent remakes of the fitting. In this sense, the second demarcation represents the maximum additional axial length for subsequent remakes. Accordingly, using this configuration a user will know the fitting assembly has been properly pulled-up when the nut 1020 reaches the first demarcation or leading edge 1060. Additionally, the user will be able to determine how many subsequent remakes the fitting assembly 10' can handle by evaluating the additional axial length between the pull-up and the maximum pull-up. It should be appreciated that a third configuration can be used, wherein three demarcations are used. A first demarcation would represent the finger-tight position, a second demarcation would represent the proper initial pull-up position, and a third demarcation would represent the maximum additional axial length for subsequent remakes.

Figure 32:
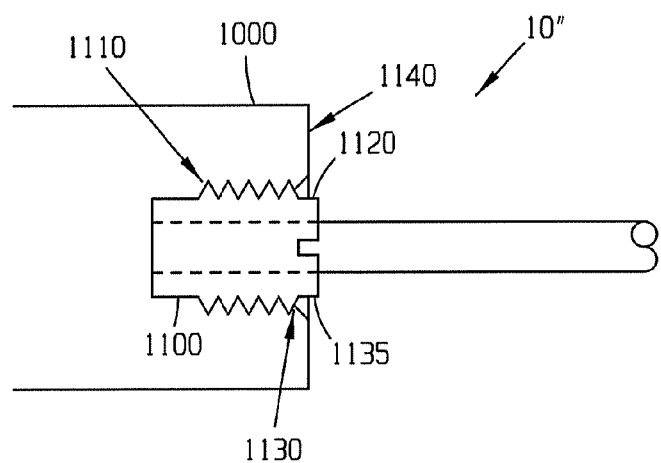
FIG. 32 illustrates another embodiment with a threaded stub member including intrinsic gauging.
Figure 33:
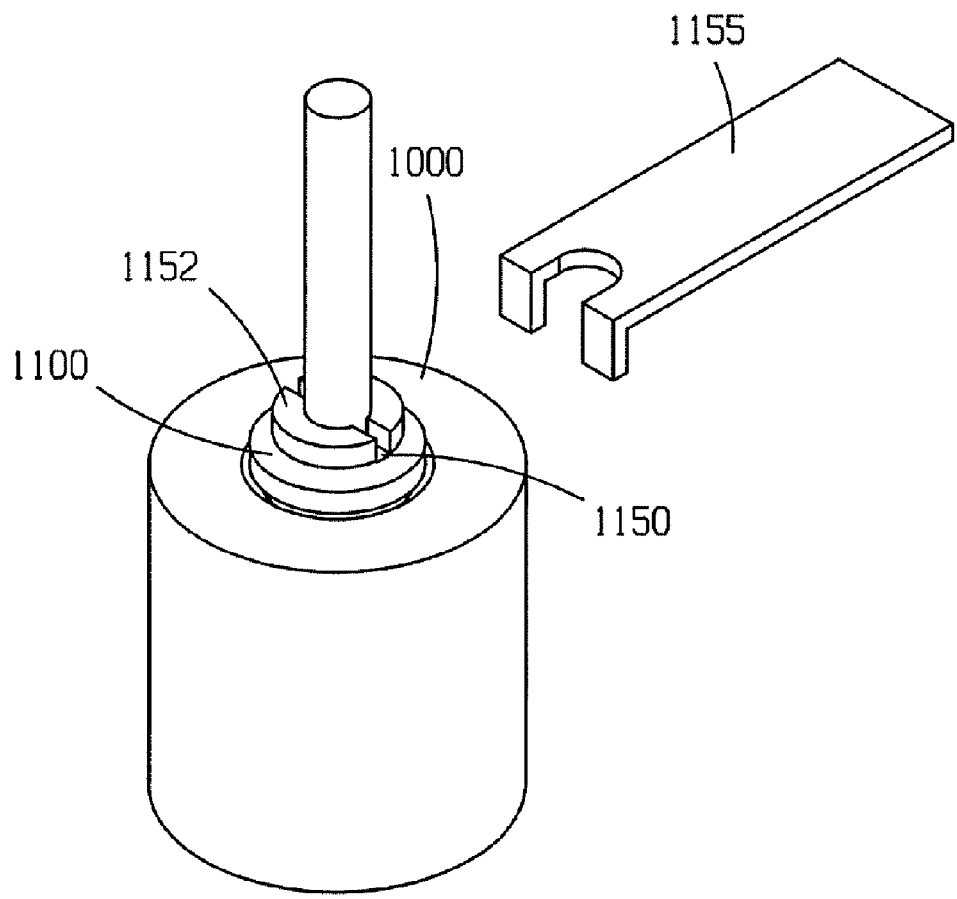
FIG. 33 illustrates a fitting and tool for assembling such fitting.

In another embodiment, shown in FIG. 32, the threaded coupling member 1000 is joined with a threaded stud member 1100 to form the fitting assembly 10''. The remainder of the fitting assembly 10'' can be similar to that shown in FIG. 31, or may include different components, arrangements, or configurations. The threaded stud member 1100 includes a threaded region 1110 and a head region 1120. The head region 1120 of the threaded stud member 1100 includes intrinsic gauging that will determine proper pull-up of the fitting assembly 10''. The intrinsic gauging may take a number of forms. As an illustrative example, FIG. 32 provides the threads ends 1130 as a first demarcation and the end 1135 of the threaded stud member 1100 as the second demarcation. As such, the thread ends 1130 will reach the end face 1140 of the coupling member 1000 when the fitting assembly 10'' is in the finger tight position. Furthermore, when the end 1135 of the threaded stub member 1100 aligns with the end face 1140 of the coupling member 1000, the fitting assembly 10'' will be in the proper initial pull-up position. In another embodiment, the thread ends 1130 can mark the proper initial pull-up position and the end 1135 of the threaded stud member 1100 can mark the additional axial length for subsequent remakes or the maximum pull-up position. In another embodiment, the thread ends 1130 can mark the finger tight position, a demarcation, such as, for example, an etching, a recess, knurling, a colored region, a colored band, a groove, a colored groove, or a band, ring or other attachable object, would mark the proper initial pull-up position, and the end 1135 of the threaded stub member 1100, or other demarcation would mark the maximum axial length for subsequent remakes for the fitting assembly 10''. These embodiments are helpful in determining proper pull-up of fittings, such as those shown in FIG. 33. In such fittings, a gap or recess 1150 is located in the front face 1152 of the fitting and a tool 1155 such as that shown in FIG. 33 is used to tighten or loosen the fitting.

The invention has been described with reference to the preferred and exemplary embodiments. Modifications and alterations will occur to others upon a reading and understanding of this specification. It is intended to include all such modifications and alterations insofar as they come within the scope of the claimed invention or the equivalents thereof.

What is claimed is:

1. Intrinsic gauging assembly for a ferrule type tube fitting, comprising:
    a coupling body having a threaded end and at least one ferrule contained therein;
    a threaded coupling nut that mates with said threaded end of the coupling body;
    a visually perceptible marking on the threaded coupling nut that is visible when the fitting is in a finger tight condition, and that is substantially imperceptible after the fitting has been assembled on a tube end to an initial pull-up position.

2. The intrinsic gauging assembly of claim 1, wherein said visually perceptible marking is knurling.

3. The intrinsic gauging assembly of claim 1, wherein said visually perceptible marking is a colored region.

4. The intrinsic gauging assembly of claim 1, wherein said visually perceptible marking is a colored band.

5. The intrinsic gauging assembly of claim 1, wherein said visually perceptible marking is a ring.

6. The intrinsic gauging assembly of claim 1, wherein said visually perceptible marking is one or more etchings.

7. The intrinsic gauging assembly of claim 1, wherein said visually perceptible marking is a groove.

8. The intrinsic gauging assembly of claim 1, wherein said visually perceptible marking is a recess.

9. The intrinsic gauging assembly of claim 1, wherein said visually perceptible marking is on a neck portion of said coupling nut.

10. The intrinsic gauging assembly of claim 1, wherein a portion of the coupling body is work hardened.

11. Intrinsic gauging assembly for a ferrule type tube fitting, comprising
   a coupling body having a threaded end;
   a threaded coupling nut that mates with said threaded end of the coupling body;
   at least one ferrule retained in the coupling body interior; and
   a visually perceptible marking on the coupling nut; wherein said marking includes a first demarcation and a second demarcation; wherein said first demarcation corresponds to an initial pull-up position and said second demarcation corresponds to a subsequent remake position.

12. The intrinsic gauging assembly of claim 11, wherein said visually perceptible marking is knurling.

13. The intrinsic gauging assembly of claim 11, wherein said visually perceptible marking is a colored region.

14. The intrinsic gauging assembly of claim 11, wherein said visually perceptible marking is a colored band.

15. The intrinsic gauging assembly of claim 11, wherein said visually perceptible marking is a ring.

16. The intrinsic gauging assembly of claim 11, wherein said first demarcation and said second demarcation are etchings.

17. The intrinsic gauging assembly of claim 11, wherein said visually perceptible marking is a groove.

18. The intrinsic gauging assembly of claim 11, wherein said visually perceptible marking is a recess.

19. The intrinsic gauging assembly of claim 11, wherein said visually perceptible marking is on a neck portion of said coupling nut.

20. The intrinsic gauging assembly of claim 11, wherein a portion of the coupling nut is work hardened.

21. The intrinsic gauging assembly of claim 11 further comprising a third demarcation that is visible when the fitting is in a finger tight condition and generally imperceptible when the fitting is in an initial pulled-up position.

22. The intrinsic gauging assembly of claim 11, wherein a portion of the coupling nut is work hardened.

23. Intrinsic gauging assembly for a ferrule type tube fitting, comprising:
   a coupling body having a threaded end and at least one ferrule contained therein;
   a threaded stud member having a threaded portion that mates with said threaded end of the coupling body;
   intrinsic gauging means located on said threaded stud member, wherein said intrinsic gauging means indicates when said threaded stud member is properly pulled-up;
   wherein said intrinsic gauging means includes an end of said threaded portion of said threaded stud member and an end of the threaded stud member, wherein said end of said threaded portion of said threaded stud member and said end of said threaded stud member have an axial length therebetween, said length providing information regarding the pull-up of the assembly; and
   wherein the threaded stud member is in a finger tight position when said end of said threaded portion of said threaded stud member aligns with a front face of said coupling body and is in a pull-up position when said end of said threaded stud member aligns with said front face of said coupling member.

24. Intrinsic gauging assembly for a ferrule type tube fitting, comprising:
   a coupling body having a threaded end and at least one ferrule contained therein;
   a threaded stud member having a threaded portion that mates with said threaded end of the coupling body;
   intrinsic gauging means located on said threaded stud member, wherein said intrinsic gauging means indicates when said threaded stud member is properly pulled-up;
   wherein said intrinsic gauging means includes an end of said threaded portion of said threaded stud member and an end of the threaded stud member, wherein said end of said threaded portion of said threaded stud member and said end of said threaded stud member have an axial length therebetween, said length providing information regarding the pull-up of the assembly; and
   wherein the threaded stud member is in an initial pull-up position when said end of said threaded portion of said threaded stud member aligns with a front face of said coupling body and is in a subsequent remake position when said end of said threaded stud member aligns with said front face of said coupling member.

25. Intrinsic gauging assembly for a ferrule type tube fitting, comprising:
   (a) a coupling body having a threaded end and at least one ferrule contained therein;
   (b) a threaded coupling nut that mates with said threaded end of the coupling body; and
   (c) at least three marking indicating a pull-up position;
      (i) a first marking indicating a finger-tight position;
      (ii) a second marking indicating an initial pull-up position; and
      (iii) a third marking indicating a subsequent remake position.

26. The intrinsic gauging assembly of claim 25 further comprising an axial length between said first and second marking, wherein said axial length is substantially imperceptible when said assembly is in the initial pull-up position.

27. Intrinsic gauging assembly for a ferrule type tube fitting, comprising:
   a coupling body having a threaded end that is capable of receiving a tube end;
   a threaded coupling nut that mates with said threaded end of the coupling body;

at least one ferrule retained in the nut interior; and a visually perceptible marking on the coupling body that is visible when the fitting is in a finger tight condition, and that is substantially imperceptible after the fitting has been assembled on a tube end to an initial pull-up position, wherein the visually perceptible marking comprises a lubricant.

28. The assembly of claim 27 wherein said marking further comprises a machined surface on the coupling body.

29. The assembly of claim 27 wherein marking further comprises a band having a predetermined axial length.

30. The assembly of claim 27 wherein said lubricant comprises a thread lubricant.

31. The assembly of claim 27 wherein said lubricant has a perceptible color.

32. The assembly of claim 27 wherein said lubricant is tungsten or molybdenum disulfide.

33. A method for gauging proper pull-up of a coupling nut on a coupling body in a ferrule type fitting, comprising the steps of:
  a. forming a visually perceptible marking on the coupling body, wherein said marking comprises a lubricant applied to a set of threads associated with the coupling body;
  b. said forming step comprising applying the marking to correspond to a predetermined axial displacement of the coupling nut relative to the coupling body for initial pull-up; and
  c. assembling the coupling nut onto the coupling body until the marking is substantially covered by said coupling nut.

34. Intrinsic gauging assembly for a tube fitting of the type having a body, a nut threadably coupled to the body and at least one ferrule, comprising:
  a first marking on the body and a second marking on the nut, said first and second markings being aligned when the fitting is in a finger tight condition, said markings being unaligned as the fitting is pulled up, and said markings being aligned again when the fitting is fully made up.

35. The assembly of claim 34 wherein said first and second markings are laser etched.

36. The assembly of claim 34 further comprising a third marking on the body, wherein said third marking aligns with the marking on the nut when the axial displacement of the nut relative to the body has reached a predetermined subsequent remake position.

37. The assembly of claim 34 further comprising a third marking on the nut, where said third marking aligns with the marking on the nut when the axial displacement of the nut relative to the body has reached a predetermined subsequent remake position.

* * * * *

UNITED STATES PATENT AND TRADEMARK OFFICE
Certificate

Patent No. 7,194,817 B2                                                                                                    Patented: March 27, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Peter C. Williams, Cleveland Heights, OH (US); Lonnie E. Johnston, Dandridge, OH (US); John D. Karkosiak, Broadview Heights, OH (US); Gerald A. Babuder, Avon, OH (US); Sanjeev S. Moghe, Chagrin Falls, OH (US); and Gary W. Scheffel, Streetsboro, OH (US).

Signed and Sealed this Third Day of January 2012.

JINHEE J. LEE
*Supervisory Patent Examiner*
Art Unit 2841
Technology Center 2800